United States Patent
Reza et al.

(10) Patent No.: US 11,967,048 B2
(45) Date of Patent: Apr. 23, 2024

(54) ELECTRONIC DEVICE FOR IMAGE PROCESSING AND OPERATING METHOD OF THE SAME

(71) Applicant: SAMSUNG ELECTRONICS CO., LTD., Suwon-si (KR)

(72) Inventors: Sakib Reza, Dacca (BD); Arup Kumar Sarker, Dacca (BD); Redwanul Haque Sourave, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 17/832,164

(22) Filed: Jun. 3, 2022

(65) Prior Publication Data

US 2023/0011259 A1     Jan. 12, 2023

Related U.S. Application Data

(63) Continuation of application No. PCT/KR2022/004930, filed on Apr. 6, 2022.

(30) Foreign Application Priority Data

Jul. 6, 2021  (KR) .......................... 10-2021-0088572

(51) Int. Cl.
*G06T 5/00* (2006.01)
*G06T 5/50* (2006.01)
(Continued)

(52) U.S. Cl.
CPC .............. *G06T 5/002* (2013.01); *G06T 5/50* (2013.01); *G06T 7/50* (2017.01); *H04N 23/74* (2023.01);
(Continued)

(58) Field of Classification Search
CPC .. G06T 5/002; G06T 5/50; G06T 7/50; G06T 2207/20081; G06T 2207/20084;
(Continued)

(56) References Cited

U.S. PATENT DOCUMENTS 4,965,442 A   10/1990   Girod et al.
5,434,612 A    7/1995   Nettleton et al.
(Continued)

FOREIGN PATENT DOCUMENTS

CN      107103590 B    10/2019
KR   10-2013-0033331 A   4/2013
(Continued)

OTHER PUBLICATIONS

Agrawal, Amit et al., "Removing Photography Artifacts using Gradient Projection and Flash-Exposure Sampling", Jul. 2005. (8 pages total).
(Continued)

*Primary Examiner* — Hung H Lam
(74) *Attorney, Agent, or Firm* — Sughrue Mion, PLLC

(57) ABSTRACT

Provided are methods, performed by an electronic device, for processing an image. The method includes obtaining a first image by photographing a subject. The method further includes obtaining a depth image including information related to a distance from the electronic device to the subject. The method further includes determining whether light reflection exists in the first image. The method further includes obtaining depth information indicating the distance from the electronic device to the subject. The method further includes obtaining a second image by photographing the subject in an activated state of a flash. The method further includes performing pre-processing for matching the first image, the second image, and the depth image. The method further includes obtaining the image from which the light
(Continued)

reflection has been removed using at least one of the pre-processed first image, the pre-processed second image, or the pre-processed depth image.

20 Claims, 16 Drawing Sheets

(51) Int. Cl.
*G06T 7/50* (2017.01)
*H04N 23/74* (2023.01)

(52) U.S. Cl.
CPC ............... *G06T 2207/20081* (2013.01); *G06T 2207/20084* (2013.01)

(58) Field of Classification Search
CPC .................... G06T 5/008; G06T 7/521; G06T 2207/10024; G06T 2207/10028; G06T 2207/10152; H04N 23/74; H04N 13/254; H04N 13/271; H04N 23/00; H04N 23/60; H04N 23/70; H04N 23/80; H04N 23/958; H04N 23/56; H04N 23/81
See application file for complete search history.

(56) References Cited

U.S. PATENT DOCUMENTS

| | | | |
|---|---|---|---|
| 7,920,179 | B2 | 4/2011 | Thorn |
| 9,948,864 | B2 | 4/2018 | Du et al. |
| 10,234,561 | B2 | 3/2019 | Godbaz et al. |
| 10,375,279 | B2 | 8/2019 | Ilic |
| 10,812,735 | B2 | 10/2020 | Hirasawa et al. |
| 11,766,167 | B2 * | 9/2023 | Nakamura ............. A61B 1/046 348/45 |
| 2016/0054113 | A1 * | 2/2016 | Osawa .................. G01J 3/0289 356/497 |
| 2016/0349369 | A1 * | 12/2016 | Lee ......................... G06T 7/586 |
| 2017/0287152 | A1 * | 10/2017 | Ushijima ................ G01S 17/10 |
| 2019/0017812 | A1 | 1/2019 | Nakagawa et al. |
| 2020/0019760 | A1 * | 1/2020 | Ma .......................... G06V 40/16 |
| 2020/0314294 | A1 | 10/2020 | Schoenlieb et al. |
| 2021/0231812 | A1 * | 7/2021 | Gil-Cacho ............. G01S 7/493 |
| 2021/0358211 | A1 | 11/2021 | Kim et al. |
| 2023/0075063 | A1 * | 3/2023 | Aladahalli ........... A61B 8/4254 |

FOREIGN PATENT DOCUMENTS

| | | |
|---|---|---|
| KR | 10-2020-0040194 A | 4/2020 |
| WO | 2017/154707 A1 | 9/2017 |
| WO | 2018/092540 A1 | 5/2018 |

OTHER PUBLICATIONS

AI Camera Market Research Report: By Type Smartphone Cameras, Surveillance Cameras, DSLRs, others}, By Technology (Image/Face Recognition, Speech/Voice Recognition, Computer Vision, others} and by Region (North America, Europe, Asia-Pacific, Middle East & Africa and South America)—Forecast till 2021, Feb. 2021. (8 pages total).

"Huawei P40 Pro review: Camera champ gets fuselage to match", Apr. 2020, (https://news.abs-cbn.com/business/04/09/20/huawei-p40-pro-review-camera-champ-gets-fuselage-to-match). (9 pages total).

Sun, Jun et al., "Multi-Modal Reflection Removal Using Convolutional Neural Networks", IEEE Signal Processing Letters, vol. 26, No. 7, Jul. 2019, pp. 1011-1015. (5 pages total).

Chang, Yakun et al., "Siamese Dense Network for Reflection Removal with Flash abd No=Flash Image Pairs", International Journal of Computer Vision, Jan. 2020. (26 pages total).

Cheng, Kuanhong et al., "Single image reflection removal via attention model and Sn—GaN", IEEE Access, May 2020. (8 pages total).

Abiko, Ryo et al., "Single Image Reflection Removal Based on GaN With Gradient Constraint", IEEE Access, Oct. 24, 2019, pp. 148790-148799. (10 pages total).

Chou, Nien-Hsin et al., "Intensity-aware GaN for Single Image Reflection Removal", Proceedings of APSIPA Annual Summit and Conference 2019, Nov. 18-21, 2019, Lanshou, China. (5 pages total).

Browlee, Jason, "A Gentle Introduction to Generative Adversarial Network Loss Functions", Machine Learning Mastery, Sep. 2019, (=https://machinelearningmastery.com/generative-adversarial-network-loss-functions/). (16 pages total).

"Time-of-Flight Camera—An Introduction", Mouser Electronics, Jan. 2014, (=https://eu.mouser.com/applications/time-of-flight-robotics/). (5 pages total).

Ramos, Daniel et al., "Deconstructing Cross-Entropy for Probabilistic Binary Classifiers", Entropy, Mar. 20, 2018, vol. 20, No. 208. (20 pages total).

Goldman, Dan B. et al., "Vignette and Exposure Calibration and Compensation", Proceedings of the Tenth IEEE International Conference on Computer Vision (ICCV'05), Computer Society, Oct. 2005. (8 pages total).

Jacobsen, Karsten, "Geometric Calibration of Space Remote Sensing Cameras for Efficient Processing", Feb. 1998. (11 pages total).

Su, Huihuang et al., "Stereo rectification of calibrated image pairs based on geometric transformation", I.J.Modern Education and Computer Science, Jul. 2011, vol. 4, pp. 17-24. (8 pages total).

"Image rectification", Wikipedia, downloaded May 20, 2022, (https://en.wikipedia.org/wiki/Image_rectification). (4 pages total).

"U-Net", Wikipedia, downloaded May 23, 2022, (https://en.wikipedia.org/wiki/U-Net). (2 pages total).

Chenyang Lei et al., "Robust Reflection Removal with Reflection-free Flash-only Cues", arXiv:2103.04273v2, Mar. 2021, 12 pages total.

Communication dated Jul. 14, 2022 issued by the International Searching Authority in counterpart Application No. PCT/KR2022/004930 (PCT/ISA/220, PCT/ISA/210, and PCT/ISA/237).

* cited by examiner

ELECTRONIC DEVICE FOR IMAGE PROCESSING AND OPERATING METHOD OF THE SAME

CROSS-REFERENCE TO RELATED APPLICATIONS

This application is a continuation application of International Application No. PCT/KR2022/004930, filed on Apr. 6, 2022, which claims benefit of priority to Korean Patent Application No. 10-2021-0088572, filed on Jul. 6, 2021, in the Korean Intellectual Property Office, the disclosures of which are incorporated herein in their entireties by reference.

BACKGROUND

1. Technical Field

Embodiments of the present disclosure relate to an electronic device, and more specifically, to performing image processing and an operating method thereof.

2. Description of Related Art

As a photographing device for enabling an electronic device to photograph subjects, a camera interface, such as a red, green, and blue (RGB) camera, a depth camera, etc., is provided. The electronic device can provide a user with an improved camera use experience by photographing a subject through a camera and performing image processing on an image of the photographed subject to remove noise from the image.

When a user of the electronic device photographs a subject, light reflected from material other than the subject (e.g., glass or the like) may be incident on the camera. In this case, noise may exist in an image of the photographed subject due to light reflection, and it is necessary to remove such noise.

Accordingly, there exists a need for further improvements to image processing methods, such as for removing noise, which may have been caused by light reflection, from an image.

SUMMARY

Embodiments of the present disclosure are provided to overcome the above-described problem, and to provide an electronic device for removing noise, which may be caused by light reflection, in an image, and an operating method of the electronic device.

According to an aspect of the disclosure, a method, performed by an electronic device, of processing an image, the method including: obtaining a first image by photographing a subject; obtaining a depth image including information related to a distance from the electronic device to the subject; determining whether light reflection exists in the first image; obtaining, based on determining that the light reflection exists in the first image, depth information indicating the distance from the electronic device to the subject; obtaining, based on the depth information, a second image by photographing the subject in an activated state of a flash of the electronic device; performing pre-processing for matching the first image, the second image, and the depth image and representing the first image, the second image, and the depth image on a coordinate system; and obtaining an image from which the light reflection has been removed using at least one of the pre-processed first image, the pre-processed second image, or the pre-processed depth image.

The determining of whether the light reflection exists in the first image may include applying the first image to a light reflection detecting model.

The obtaining of the second image may include determining whether to activate the flash of the electronic device by comparing the depth information with a threshold value.

The determining of whether to activate the flash may include, based on a result of the comparing of the depth information with the threshold value indicating that the depth information is smaller than the threshold value, determining to activate the flash of the electronic device and obtaining the second image by photographing the subject in the activated state of the flash of the electronic device.

The obtaining of the image from which the light reflection has been removed may include applying the first image, the second image, and the depth image to a light reflection removing model.

The determining of whether to activate the flash my include, based on a result of the comparing of the depth information with the threshold value indicating that the depth information is greater than or equal to the threshold value, inactivating the flash of the electronic device, and the obtaining of the image from which the light reflection has been removed may include obtaining the image from which the light reflection has been removed using the pre-processed first image and the pre-processed depth image.

The performing of the pre-processing may include: projecting the first image, the second image, and the depth image onto a common image plane; matching first pixels of the first image, second pixels of the second image, and third pixels of the depth image; and performing calibration on each of the first pixels of the first image, the second pixels of the second image, and the third pixels of the depth image such that the first pixels of the first image, the second pixels of the second image, and the third pixels of the depth image have a same brightness.

The applying of the first image, the second image, and the depth image to the light reflection removing model may include: receiving, by a main model of the light reflection removing model, the first image and outputting the image from which the light reflection has been removed; receiving, by a first sub model of the light reflection removing model, the second image and outputting at least one first feature map related to the second image, wherein the at least one first feature map is to be input to a neural network layer included in the main model; and receiving, by a second sub model of the light reflection removing model, the depth image and outputting at least one second feature map related to the depth image, wherein the at least one second feature map is to be input to the neural network layer included in the main model.

The light reflection removing model may share a feature map extracted from the first image, the second image, and the depth image, in at least one portion of a plurality of neural network layers included in the main model, the first sub model, and the second sub model.

The method may further include: training a model configured to identify the image without the light reflection, using images from which the light reflection has been removed and which are output from the light reflection removing model, and other images without the light reflection; and updating the light reflection removing model, based on a loss function of the trained model configured to identify the image without the light reflection.

According to an aspect of the disclosure, a method, performed by an electronic device, of processing an image, the method including: obtaining a first image by photographing a subject; obtaining a depth image including depth information related to a distance from the electronic device to the subject; determining whether light reflection exists in the first image; obtaining, based on the depth information, a second image by photographing the subject in an activated state of a flash of the electronic device; assigning, based on the depth information, a weight to the second image; performing pre-processing on the first image, the second image, and the depth image to represent the first image, the second image, and the depth image on a coordinate system; and obtaining an image from which the light reflection has been removed using at least one of the pre-processed first image, the pre-processed second image, or the pre-processed depth image, according to the weight assigned to the second image.

According to an aspect of the disclosure, an electronic device for processing an image includes: a camera module; a memory storing one or more instructions; and at least one processor communicatively coupled to the camera module and the memory, and configured to execute the one or more instructions stored in the memory to: obtain, using the camera module, a first image by photographing a subject; obtain, using the camera module, a depth image including information related to a distance from the electronic device to the subject; determine whether light reflection exists in the first image; obtain, based on a determination that the light reflection exists in the first image, depth information indicating the distance from the electronic device to the subject; obtain, based on the depth information, a second image by photographing the subject in an activated state of a flash of the electronic device; perform pre-processing for matching the first image, the second image, and the depth image and representing the first image, the second image, and the depth image on a coordinate system; and obtain an image from which the light reflection has been removed, using at least one of the pre-processed first image, the pre-processed second image, or the pre-processed depth image.

According to an aspect of the disclosure, provided is a computer-readable recording medium having recorded thereon a program for executing the method according to the first aspect of the disclosure, on a computer.

DETAILED DESCRIPTION

Figure 1:
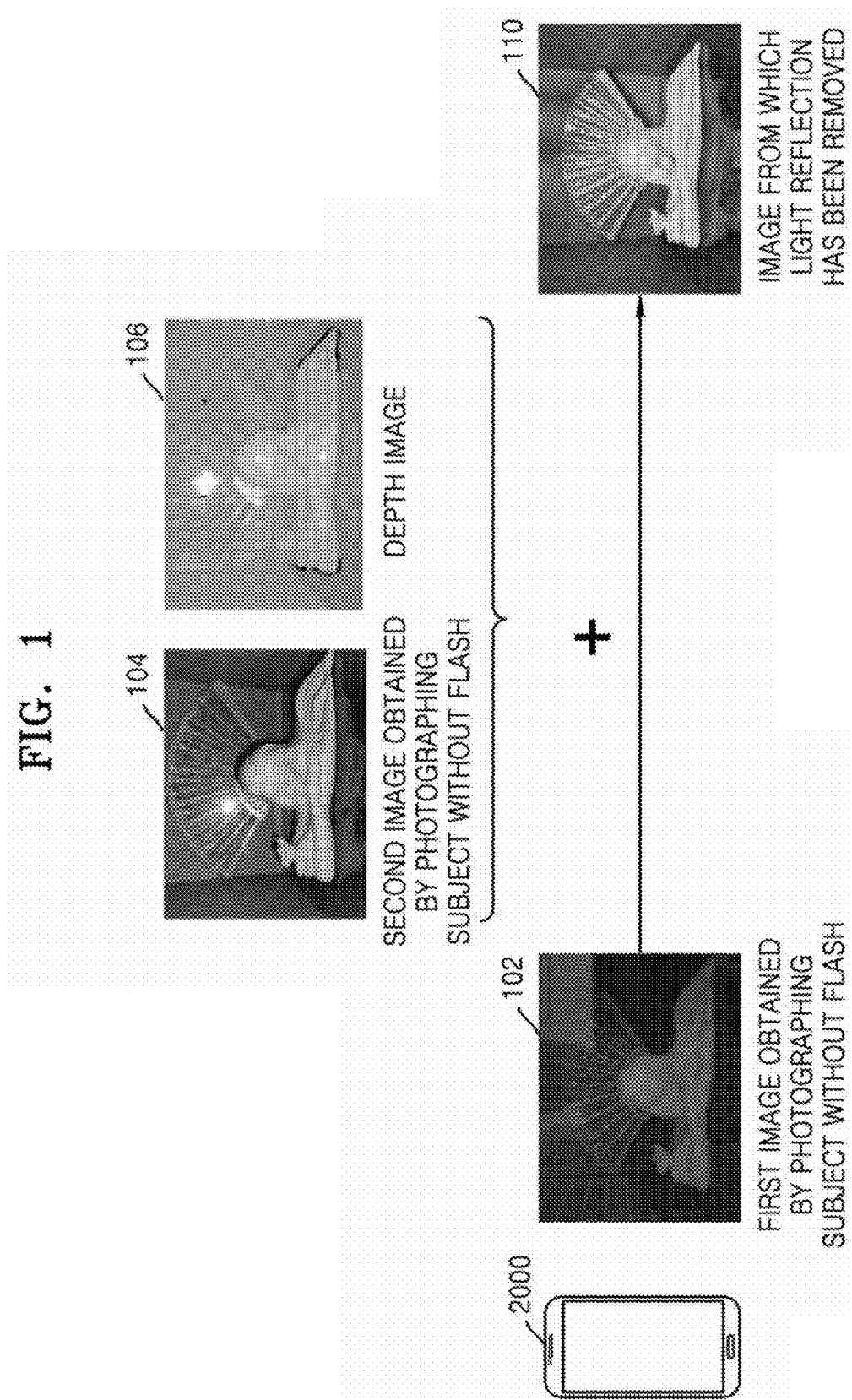
FIG. 1 is a view for schematically describing a method, performed by an electronic device according to an embodiment of the disclosure, of obtaining an image from which light reflection has been removed.

Throughout the disclosure, the expression "at least one of a, b, or c" indicates only a, only b, only c, both a and b, both a and c, both b and c, all of a, b, and c, or variations thereof.

Terms used in this specification will be briefly described, and the disclosure will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise. Unless defined otherwise, all terms used herein, including technical or scientific terms, have the same meaning as commonly understood by one of ordinary skill in the technical art described in the present specification. Also, it will be understood that, although the terms including ordinal numbers, such as "first", "second", etc., may be used herein to describe various components, these components should not be limited by these terms. These terms are only used to distinguish one component from another.

It will be understood that when a certain part "includes" a certain component, the part does not exclude another component but can further include another component, unless the context clearly dictates otherwise. As used herein, the terms "portion", "module", etc. refers to a unit that can perform at least one function or operation, and may be implemented as hardware, software, or a combination of hardware and software.

Hereinafter, embodiments of the disclosure will be described in detail with reference to the accompanying drawings so that the disclosure may be readily implemented by one of ordinary skill in the technical field to which the disclosure pertains. However, the disclosure can be implemented in various different forms, and is not limited to the embodiments of the disclosure described herein. Also, in the drawings, portions irrelevant to the description are not shown in order to definitely describe the disclosure, and throughout the entire specification, similar components are assigned like reference numerals.

FIG. 1 is a view for schematically describing a method, performed by an electronic device according to an embodiment of the disclosure, of obtaining an image from which light reflection has been removed.

Referring to FIG. 1, an electronic device 2000, according to an embodiment of the disclosure, may obtain a plurality of types of images by photographing a subject by various methods, and obtain an image 110 from which light reflection has been removed, based on the obtained images.

The electronic device 2000, according to an embodiment of the disclosure, may be a device capable of photographing a subject using a camera. For example, the electronic device 2000 may be a device, such as a smart phone, a tablet personal computer (PC), a notebook PC, a desktop PC, a television (TV), etc., although not limited thereto.

According to an embodiment of the disclosure, the electronic device 2000 may include a camera module configured with a plurality of cameras. The camera module may include a depth camera for obtaining depth images, a red, green, and blue (RGB) camera for obtaining RGB (e.g., color) images, etc. The electronic device 2000 may obtain the plurality of types of images using the camera module. For example, the electronic device 2000 may obtain a first image 102 and a second image 104 using the RGB camera. In such an example, the first image 102 may be an image obtained by photographing a subject without using a flash. Alternatively or additionally, the second image 104 may be an image obtained by photographing the subject using the flash. Alternatively or additionally, the electronic device 2000 may obtain a depth image 106 using the depth camera.

According to an embodiment of the disclosure, the electronic device 2000 may photograph a subject and obtain an image based on a user input of controlling the electronic device 2000 for the user to photograph the subject. Hereinafter, an image obtained by photographing a subject by the electronic device 2000 may be described based on a first image 102 (hereinafter, also referred to as a first image) obtained by photographing the subject in an inactivated state of the flash of the electronic device 2000.

According to an embodiment of the disclosure, when the electronic device 2000 photographs a subject using the camera module, light reflection may occur in a first image due to presence of a transparent medium between the electronic device 2000 and the subject. Alternatively or additionally, when light reflected from another object around a subject is incident to the camera, light reflection may occur in a first image. Accordingly, to remove noise caused by light reflection from an image obtained by photographing a subject, the electronic device 2000 may obtain a second image 104 (also referred to as a second image) and a depth image 106 by photographing the subject using the flash.

According to an embodiment of the disclosure, the electronic device 2000 may determine whether light reflection exists in the first image 102. When the electronic device 2000 determines that light reflection exists in the first image 102, the electronic device 2000 may remove light reflection from the first image 102 using the second image 104 and the depth image 106.

The electronic device 2000, according to an embodiment of the disclosure, may perform predefined pre-processing on the first image 102, the second image 104, and the depth image 106. The electronic device 2000 may obtain an image 110 from which light reflection has been removed, by performing an image processing method according to embodiments of the disclosure which are described below, using the pre-processed images.

Figure 2:
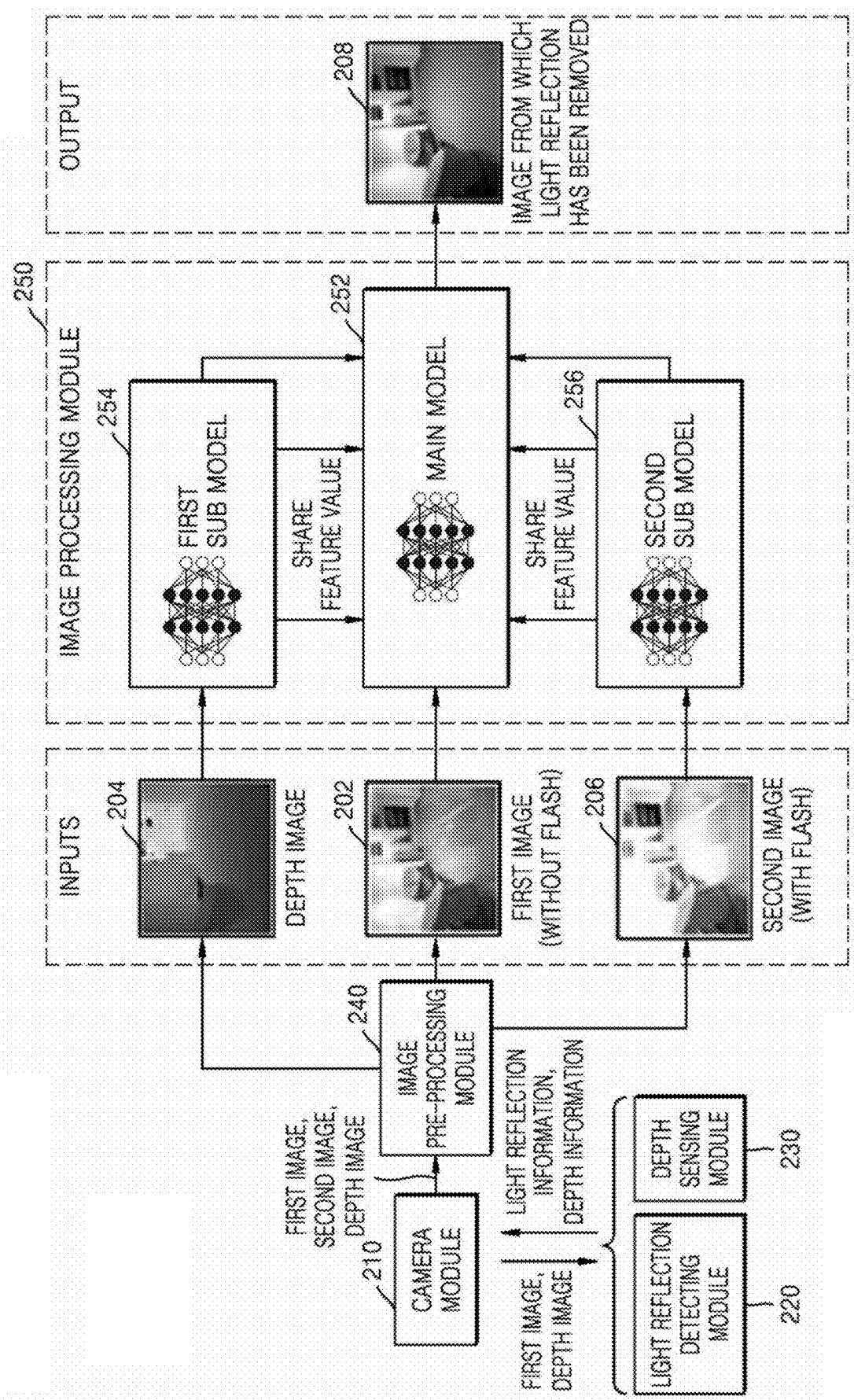
FIG. 2 is a view for describing operations of a plurality of modules used by an electronic device according to an embodiment of the disclosure to obtain an image from which light reflection has been removed.

FIG. 2 is a view for describing operations of a plurality of modules used by an electronic device according to an embodiment of the disclosure to obtain an image from which light reflection has been removed.

According to an embodiment of the disclosure, the electronic device 2000 may obtain a first image 202 and a depth image 204 using a camera module 210. The camera module 210 may include a plurality of cameras and a flash, and the plurality of cameras may be different kinds of cameras. For example, the electronic device 2000 may obtain the first image 202 using a RGB camera, and obtain the depth image 204 using a depth camera. The electronic device 2000 may analyze the first image 202 and the depth image 204 using a light reflection detecting module 220 and a depth sensing module 230.

According to an embodiment of the disclosure, the electronic device 2000 may analyze the first image 202 using the light reflection detecting module 220, and obtain light reflection information representing whether light reflection exists in the first image 202. For example, the electronic device 2000 may apply the first image 202 to a light reflection detecting model to determine whether light reflection exists in the first image 202. The operation is described in more detail with reference to FIG. 3.

When the electronic device 2000 determines that light reflection exists in the first image 202, the electronic device 2000 may analyze the depth image 204 using the depth sensing module 230, and obtain depth information indicating a distance from the electronic device 2000 to a subject. For example, the electronic device 2000 may obtain the depth information using a depth sensing algorithm based on a time-of-flight (ToF) method, for example. The operation is described in more detail with reference to FIG. 4.

According to an embodiment of the disclosure, the electronic device 2000 may determine whether to generate an image 208 from which light reflection has been removed, based on light reflection information obtained using the light reflection detecting module 220. For example, when the electronic device 2000 determines that light reflection exists in the first image 202 based on the light reflection information, the electronic device 2000 may perform operations for removing light reflection, according to embodiments of the disclosure.

According to an embodiment of the disclosure, the electronic device 2000 may obtain depth information indicating a distance from the electronic device 2000 to the subject using the depth sensing module 230. The electronic device 2000 may determine whether to activate the flash included in the camera module 210, based on the depth information. For example, when the electronic device 2000 determines that the distance from the electronic device 2000 to the subject is smaller than a preset depth threshold value based on the depth information, the electronic device 2000 may obtain a second image 206 by activating the flash and photographing the subject. A method, performed by the electronic device 2000, of determining whether to activate the flash and obtain the second image 206 based on a distance to a subject is described in more detail with reference to FIG. 5.

According to an embodiment of the disclosure, the electronic device 2000 may perform pre-processing on the first image 202, the depth image 204, and the second image 206 using an image pre-processing module 240. For example, the electronic device 2000 may perform pre-processing for matching the first image 202, the depth image 204, and the second image 206 to be represented in one coordinate system. The electronic device 2000 may generate an image 208 from which light reflection has been removed using the first image 202, the depth image 204, and the second image 206. A method, performed by the electronic device 200, of performing pre-processing on the first image 202, the depth image 204, and the second image 206 is described in more detail with reference to FIG. 6.

According to an embodiment of the disclosure, the electronic device 2000 may generate the image 208 from which light reflection has been removed, using an image processing module 250. For example, the image processing module 250 may receive the first image 202, the depth image 204, and the second image 206, and output the image 208 from which light reflection has been removed. The image processing module 250 may include one or more artificial intelligence (AI) models. For example, the image processing module 250 may include a light reflection removing model which is an AI model configured as a combination of a main model 252, a first sub model 254, and a second sub model 256. According to another example, the image processing module 250 may include a plurality of AI models respectively configured with the main model 252, the first sub model 254, and the second sub model 256.

According to an embodiment of the disclosure, the main model 252 may be an AI model configured to receive the first image 202 and output the image 208 from which light reflection has been removed. The main model 252 may include one or more neural network layers.

According to an embodiment of the disclosure, the first sub model 254 may be an AI model configured to receive the depth image 204 and output a feature map obtained from the depth image 204. The first sub model 254 may include one or more neural network layers.

According to an embodiment of the disclosure, the second sub model 256 may be an AI model configured to receive the second image 206 and output a feature map obtained from the second image 206. The second sub model 256 may include one or more neural network layers.

The electronic device 2000, according to an embodiment of the disclosure, may generate the image 208 from which light reflection has been removed by fusing the first image 202, the depth image 204, and the second image 206 using the image processing module 250. The operation is described in more detail with reference to FIGS. 7 to 11.

Figure 3:
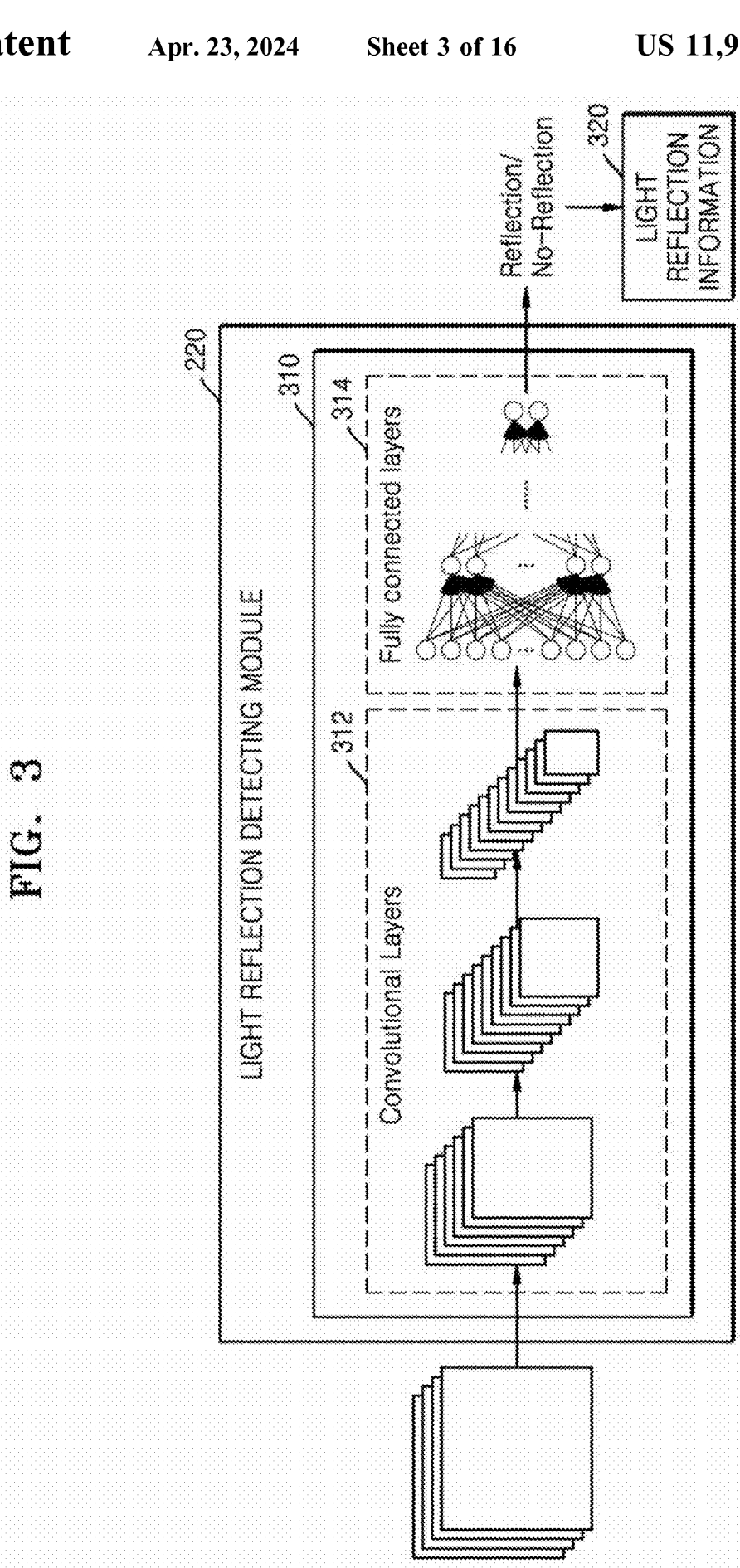
FIG. 3 is a view for describing a method, performed by an electronic device according to an embodiment of the disclosure, of determining whether light reflection exists in a captured image.

FIG. 3 is a view for describing a method, performed by an electronic device according to an embodiment of the disclosure, of detecting whether light reflection exists in a photographed image.

Operation of the light reflection detecting module 220 described above with reference to FIG. 2 is described in more detail with reference to FIG. 3.

According to an embodiment of the disclosure, the light reflection detecting module 220 may include a light reflection detecting model 310.

According to an embodiment of the disclosure, the light reflection detecting model 310 may be an AI model including one or more convolutional layers 312 for performing convolution operations and one or more fully connected layers 314 for fully connecting nodes between adjacent layers.

The light reflection detecting model 310 may be an AI model trained, based on a training dataset, to determine whether light reflection exists in an input image. For example, the training dataset may be a dataset configured with an image including light reflection and images including no light reflection. Alternatively or additionally, images included in the training dataset may be images labeled with true label values indicating whether the individual images include light reflection.

When the light reflection detecting model 310 receives an image, the light reflection detecting model 310 may determine whether light reflection exists in the received image. For example, the light reflection detecting model 310 may classify an input image to one of two kinds of classes of 'presence of light reflection' and 'absence of light reflection'.

According to an embodiment of the disclosure, the light reflection detecting model 310 may receive at least one image of a first image, a second image, and a depth image, and output light reflection information 320 representing whether light reflection exists in the received image.

The electronic device 2000, according to an embodiment of the disclosure, may determine whether to generate an image from which light reflection has been removed, based on the light reflection information 320 obtained from the light reflection detecting module 220. For example, when the electronic device 2000 determines that light reflection exists in a first image, the electronic device 2000 may perform operations for removing light reflection, according to embodiments of the disclosure.

Figure 4:
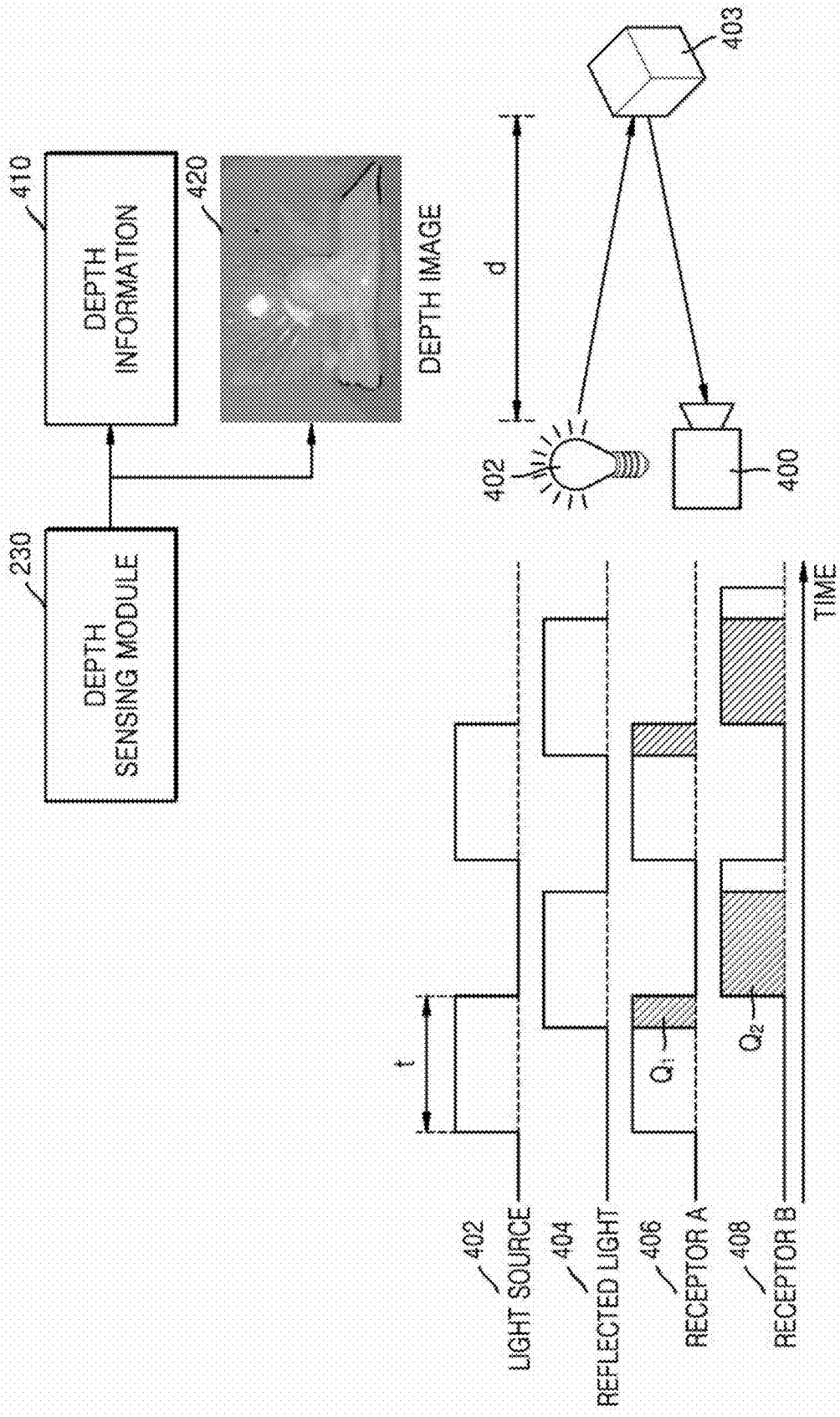
FIG. 4 is a view for describing a method, performed by an electronic device according to an embodiment of the disclosure, of obtaining depth information.

FIG. 4 is a view for describing a method, performed by an electronic device according to an embodiment of the disclosure, of obtaining depth information.

Operation of the depth sensing module 230 described above with reference to FIG. 2 is described in more detail with reference to FIG. 4.

According to an embodiment of the disclosure, the depth sensing module 230 may obtain depth information 410 and a depth image 420 using a depth camera 400. Herein, the depth information 410 may be information representing distances from the electronic device 2000 to a subject, and the depth image 420 may be image data obtained by corresponding the distances from the electronic device 2000 to the subject according to magnitudes of pixel values.

The depth camera 400 according to an embodiment of the disclosure, may be various kinds of cameras (e.g., a stereo camera, a structural optical camera, or a ToF camera) capable of obtaining depth information. However, the depth camera 400 is not limited to the above-mentioned cameras, and may be various other kinds of cameras capable of obtaining depth information.

According to an embodiment of the disclosure, the depth camera 400 may be a camera that obtains depth information by a ToF method. For example, the depth camera 400 may measure quantities of charges that are accumulated according to light reflected from a subject 403, using a ToF sensor, and calculate distances to the subject based on differences between the measured quantities of charges. For example, the ToF sensor may include a receptor A 406 for accumulating charges by receiving reflected light 404 for a time period (e.g., a time period t) for which light is emitted from a light source 402, and a receptor B 408 for accumulating charges by receiving reflected light 404 for a time period for which no light is emitted from the light source 402. For example, the depth information 410 indicating a distance d from the depth camera 400 to the subject 403 may be obtained using Equation 1 below.

$$d = \frac{ct}{2} \times \frac{Q_2}{Q_1 + Q_2} \qquad [\text{Eq. 1}]$$

where c represents the velocity of light, t represents a time length for which light is emitted from the light source 402, $Q_1$ represents a quantity of charges accumulated in the receptor A 406, and $Q_2$ represents a quantity of charges accumulated in the receptor B 408.

According to an embodiment of the disclosure, the depth sensing module 230 may obtain the depth information 410 and the depth image 420 by photographing the subject 403.

The electronic device 2000, according to an embodiment of the disclosure, may determine whether to obtain a second image by activating the flash and photographing the subject 403, based on the depth information 410 obtained from the depth sensing module 230. For example, when the distance d from the electronic device 2000 to the subject 403 is smaller than the depth threshold value, the electronic device 2000 may obtain the second image by activating the flash and photographing the subject 403.

Figure 5:
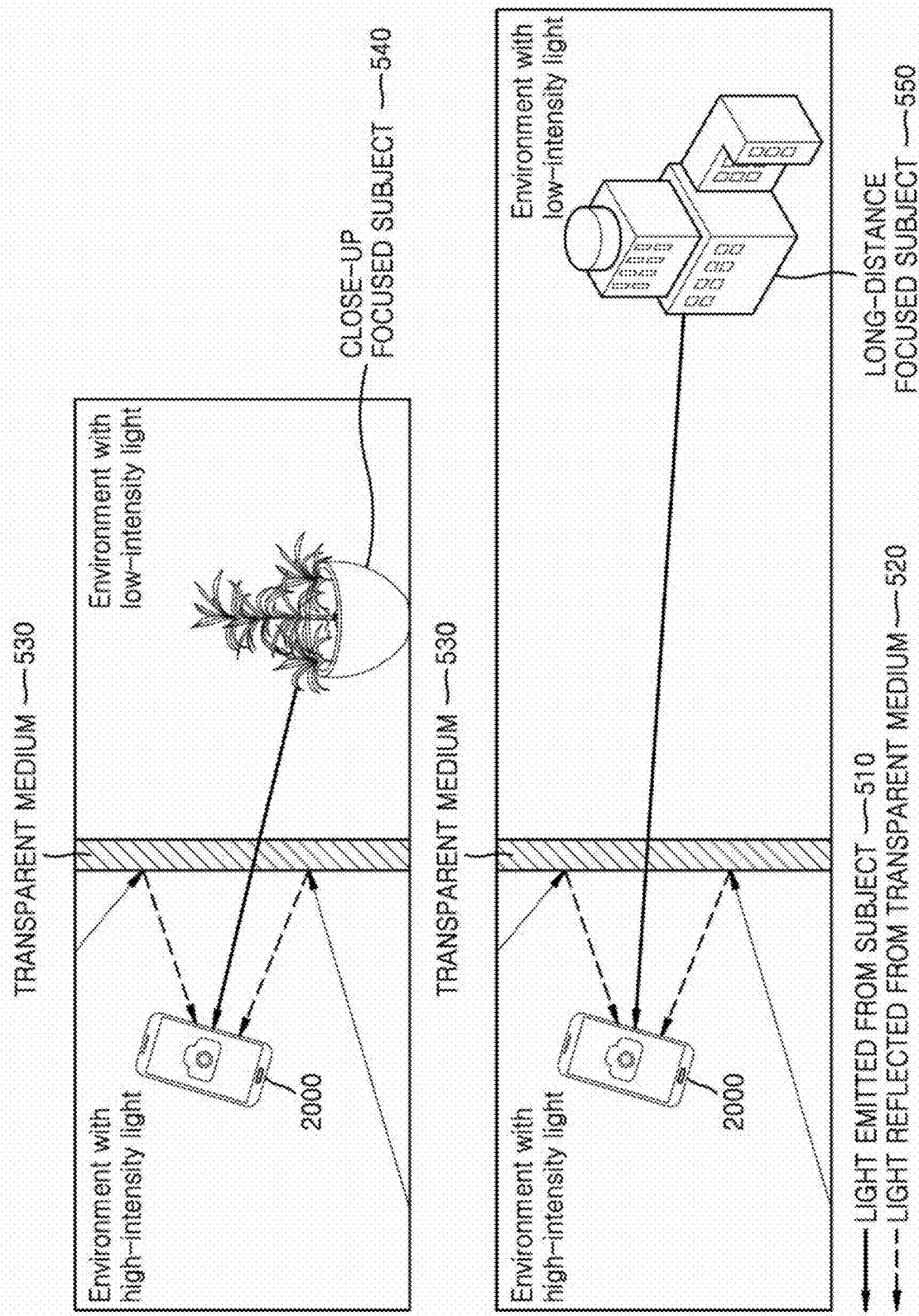
FIG. 5 is a view for describing a method, performed by an electronic device according to an embodiment of the disclosure, of determining whether to obtain a second image.

FIG. 5 is a view for describing a method, performed by an electronic device according to an embodiment of the disclosure, of determining whether to obtain a second image.

The electronic device 2000, according to an embodiment of the disclosure, may determine whether to obtain a second image by activating the flash and photographing a subject, based on light reflection information and depth information obtained according to the above-described embodiments of the disclosure.

Referring to FIG. 5, a case in which a transparent medium causing noise due to light reflection exists between the electronic device 2000 and a subject is described as an example. However, a location of a transparent medium causing noise due to light reflection is not limited thereto. A transparent medium causing noise due to light reflection may exist at another location, for example, not between the electronic device 2000 and a subject. Alternatively or additionally, another material other than a transparent medium may reflect light to cause noise due to light reflection when the electronic device 2000 photographs a subject.

According to an embodiment of the disclosure, the electronic device 2000 may obtain a first image by photographing a subject in an inactivated state of the flash. For example, the camera module 210 of the electronic device 2000 may obtain an image of the photographed subject by sensing light 510 emitted from the subject. However, due to presence of a transparent medium 530 between the electronic device 2000 and the subject, light 520 reflected from the transparent medium may be incident to the camera module 210 of the electronic device 2000 to generate light reflection in the first image. For example, the electronic device 2000 may obtain light reflection information representing whether light reflection exists in the first image, according to the above-described embodiments of the disclosure.

When the electronic device 2000 determines that light reflection exists in the first image based on the light reflection information, the electronic device 2000 may obtain depth information to perform operations for removing light reflection.

According to an embodiment of the disclosure, the electronic device 2000 may determine whether to activate the flash based on the depth information. The electronic device 2000 may compare the depth information with the depth threshold value.

For example, when a result of the comparing between the depth information and the depth threshold value by the electronic device 2000 represents that the depth information is smaller than the depth threshold value, the subject focused when the electronic device 2000 obtains the first image may be a close-up focused subject 540. In this case, because a distance between the electronic device 2000 and the close-up focused subject 540 is shorter than a preset distance criterion, details of the close-up focused subject 540 may be photographed in an improved illuminance environment by activating the flash of the electronic device 2000. The electronic device 2000 may activate the flash and photograph the close-up focused subject 540 onto which the flash is shined, thereby obtaining a second image.

According to another example, when the result of the comparing between the depth information and the depth threshold value by the electronic device 2000 represents that the depth information is greater than or equal to the depth threshold value, the subject focused when the electronic device 2000 obtains the first image may be a long-distance focused subject 550. In this case, because a distance between the electronic device 2000 and the long-distance focused subject 550 is longer than the preset distance criterion, activating the flash of the electronic device 2000 may not result in an improvement of an illuminance environment. Accordingly, the electronic device 2000 may inactivate the flash and obtain no second image. In the following embodiments of the disclosure, when no second image is obtained, the electronic device 2000 may obtain an image from which light reflection has been removed using the first image and a depth image.

According to another example, when the result of the comparing between the depth information and the depth threshold value by the electronic device 2000 represents that the depth information is greater than or equal to the depth threshold value, the subject focused when the electronic device 2000 obtains the first image may be the long-distance focused subject 550. In such an example, the electronic device 2000 may activate the flash although a distance between the electronic device 2000 and the long-distance focused subject 550 is longer than the preset distance criterion, and photograph the long-distance focused subject 550 onto which the flash is shined to obtain a second image.

In this case, the electronic device 2000 may assign a small weight to the second image obtained by photographing the long-distance focused subject 550, when the electronic device 2000 generates an image from which light reflection has been removed using the first image, the depth image, and the second image.

After the electronic device 2000 obtains the second image, the electronic device 2000, according to an embodiment of the disclosure, may perform pre-processing on the first image, the depth image, and the second image to fuse the first image, the depth image, and the second image.

Figure 6:
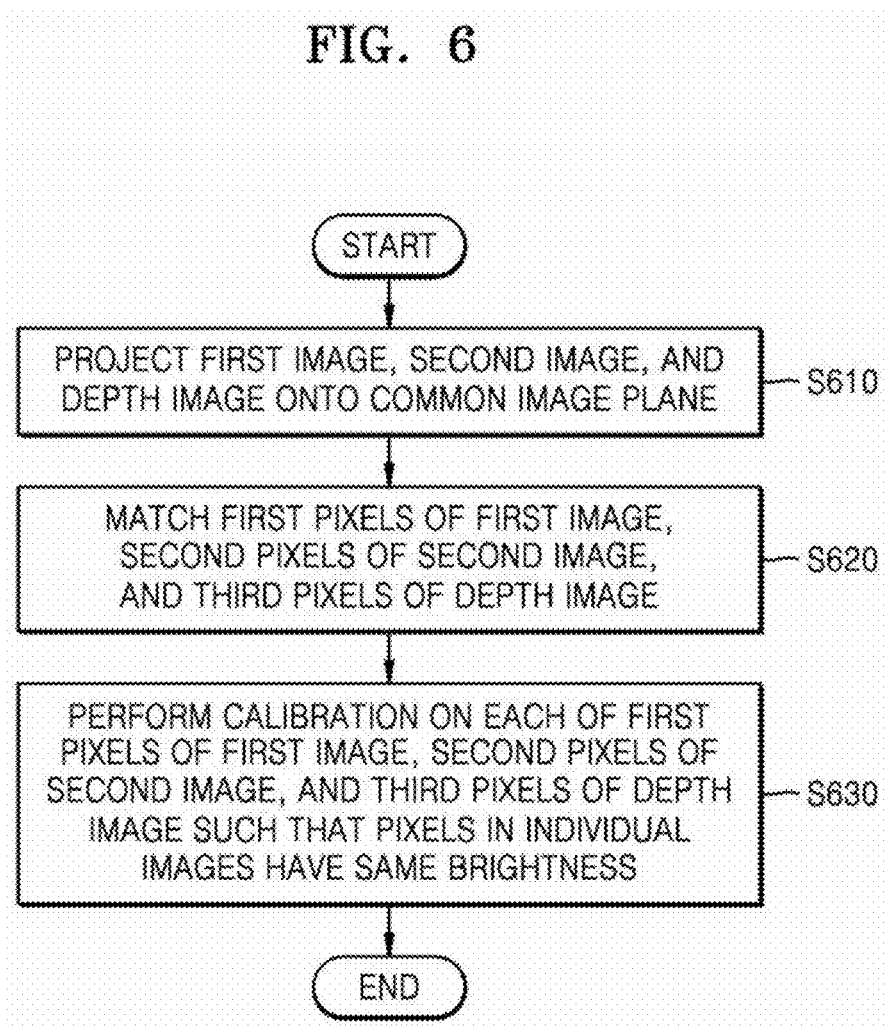
FIG. 6 is a flowchart for describing a method, performed by an electronic device according to an embodiment of the disclosure, of performing pre-processing on an image.

FIG. 6 is a flowchart for describing a method, performed by an electronic device according to an embodiment of the disclosure, of performing pre-processing on an image.

Operation of the image pre-processing module 240 described above with reference to FIG. 2 is described in more detail with reference to FIG. 6.

In operation S610, the electronic device 2000 may project a first image, a second image, and a depth image onto a common image plane. Herein, the common image plane means a plane included in a coordinate system.

According to an embodiment of the disclosure, the first image, the second image, and the depth image obtained by the electronic device 2000 may be images of the subject photographed at different time points by different cameras included in the camera module 210 of the electronic device 2000.

For example, the first image and the second image may be obtained using a RGB camera, and the depth image may be obtained using a depth camera. According to another example, the first image may be obtained using a first RGB camera, the second image may be obtained using a second RGB camera, and the depth image may be obtained using a depth camera. The electronic device 2000 may project the first image, the second image, and the depth image onto the common image plane to match pixels representing the same location in an actual real space among pixels included in the first image, the second image, and the depth image. In this case, the electronic device 2000 may project the first image, the second image, and the depth image onto the common image plane by rotating and/or twisting each of the first image, the second image, and the depth image on a three-dimensional space.

In operation S620, the electronic device 2000 may match a plurality of first pixels of the first image, a plurality of second pixels of the second image, and a plurality of third pixels of the depth image. When the electronic device 2000 matches corresponding points that are pixels representing the same location of an actual real space, the electronic device 2000 may use an epipolar constraint. The electronic device 2000 may perform image rectification for calculating an epipolar line representing candidate groups of the corresponding points using the epipolar constraint and matching the epipolar line. The electronic device 2000 may compare images transformed by a process of the image rectification with each other, search the corresponding points that are the pixels representing the same location of the actual real space, and match the searched corresponding points.

In operation S630, the electronic device 2000 may perform calibration on each of the first pixels of the first image, the second pixels of the second image, and the third pixels of the depth image such that the pixels in the individual images have the same brightness.

According to an embodiment of the disclosure, the electronic device 2000 may obtain a light-reflection removed image from which light reflection has been removed from the first image, using at least one of the pre-processed first image, the pre-processed second image, or the pre-processed depth image.

Figure 7:
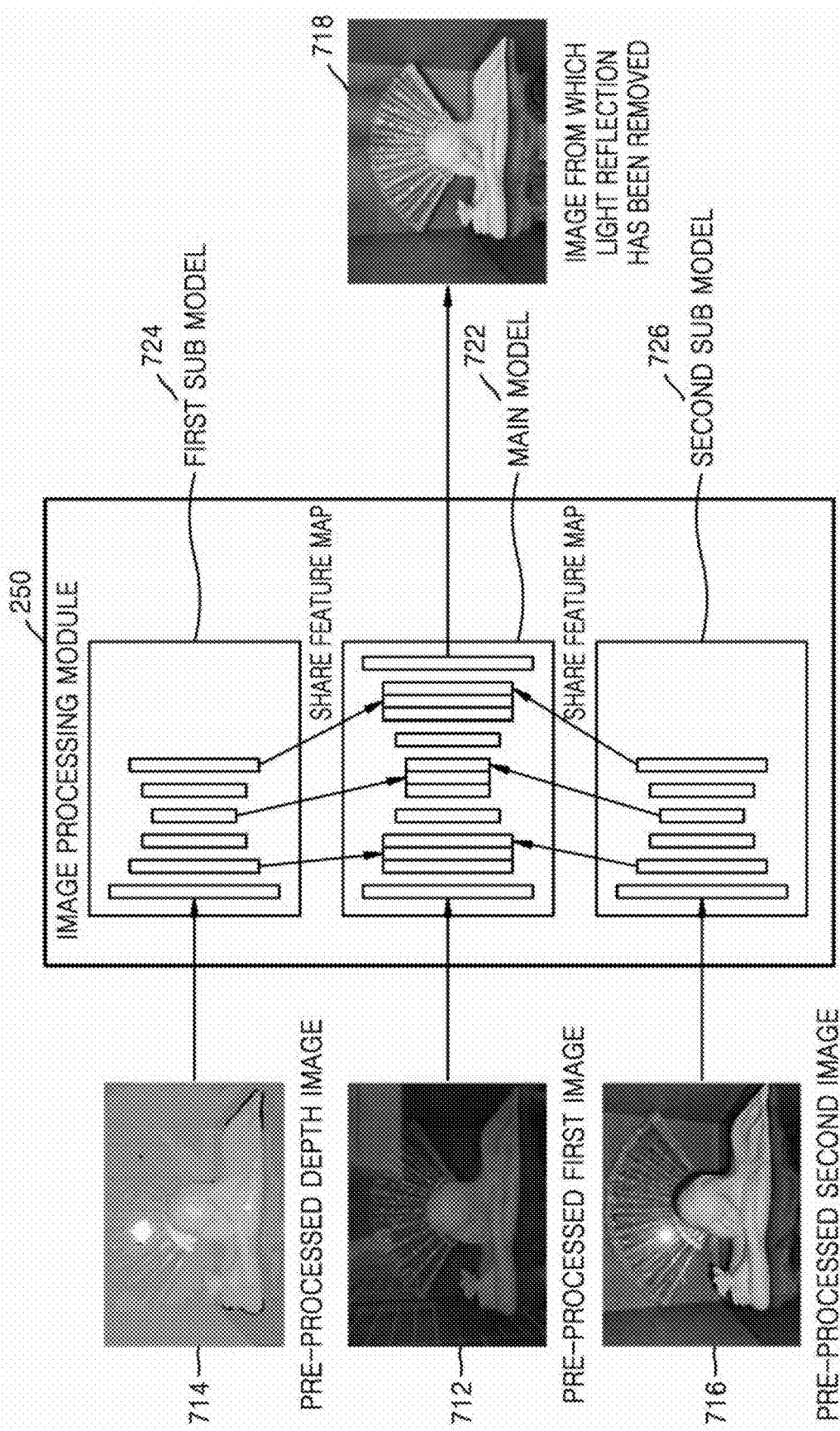
FIG. 7 is a view for describing a method, performed by an electronic device according to an embodiment of the disclosure, of obtaining an image from which light reflection has been removed using a first image, a second image, and a depth image.

FIG. 7 is a view for describing a method, performed by an electronic device according to an embodiment of the disclosure, of obtaining an image from which light reflection has been reflected using a first image, a second image, and a depth image.

Operation of the image processing module 250 described above with reference to FIG. 2 is described in more detail with reference to FIG. 7.

According to an embodiment of the disclosure, the electronic device 2000 may input a first image 712, a depth image 714, and a second image 716, pre-processed according to the above-described embodiments of the disclosure, to the image processing module 250.

According to an embodiment of the disclosure, the image processing module 250 may include a light reflection removing module which is an AI model configured as a combination of one or more AI models. For example, the image processing module 250 may include a light reflection moving model configured as a combination of a main model 722, a first sub model 724, and a second sub model 726. The main model 722, the first sub model 724, and the second sub model 726 may include or may be similar in many respects to the main model 252, the first sub model 254, and the second sub model 256, respectively, described with reference to FIG. 2, and may include additional features not mentioned above.

According to an embodiment of the disclosure, the image processing module 250 may include one or more AI models. For example, the image processing module 250 may include the main model 722, the first sub model 724, and the second sub model 726.

According to an embodiment of the disclosure, the main model 722 may be an AI model that receives a first image 712 and outputs an image 718 from which light reflection has been removed. The main model 722 may include neural network layers.

According to an embodiment of the disclosure, the first sub model 724 may be an AI model that receives the depth image 714 and outputs at least one feature map related to the depth image 714. The first sub model 724 may include a plurality of neural network layers, and the at least one feature map related to the depth image 714 may be output from at least one of the neural network layers included in the first sub model 724.

According to an embodiment of the disclosure, the second sub model 726 may be an AI model that receives the second image 716 and outputs at least one feature map related to the second image 716. The second sub model 726 may include a plurality of neural network layers, and the at least one feature map related to the second image 716 may be output from at least one of the neural network layers included in the second sub model 726.

Alternatively or additionally, according to the embodiment of the disclosure, at least some of the neural network layers included in the main model 722, the first sub model 724, and the second sub model 726 may share a feature map output from the neural network layers.

For example, a feature map output from at least some of the neural network layers included in the first sub model 724 may be shared by the main model 722. In such an example, a feature map output from at least one neural network layer included in the first sub model 724 may be input as input data to at least one neural network layer included in the main model 722.

Alternatively or additionally, a feature map output from at least some of the neural network layers included in the second sub model 726 may be shared by the main model 722. For example, a feature map output from at least one neural network layer included in the second sub model 726 may be input as input data to at least one neural network layer included in the main model 722.

A network structure in which the main model 722, the first sub model 724, and the second sub model 726 included in the image processing module 250 share a feature map is described in more detail with reference to FIGS. 8 and 9.

Figure 8:
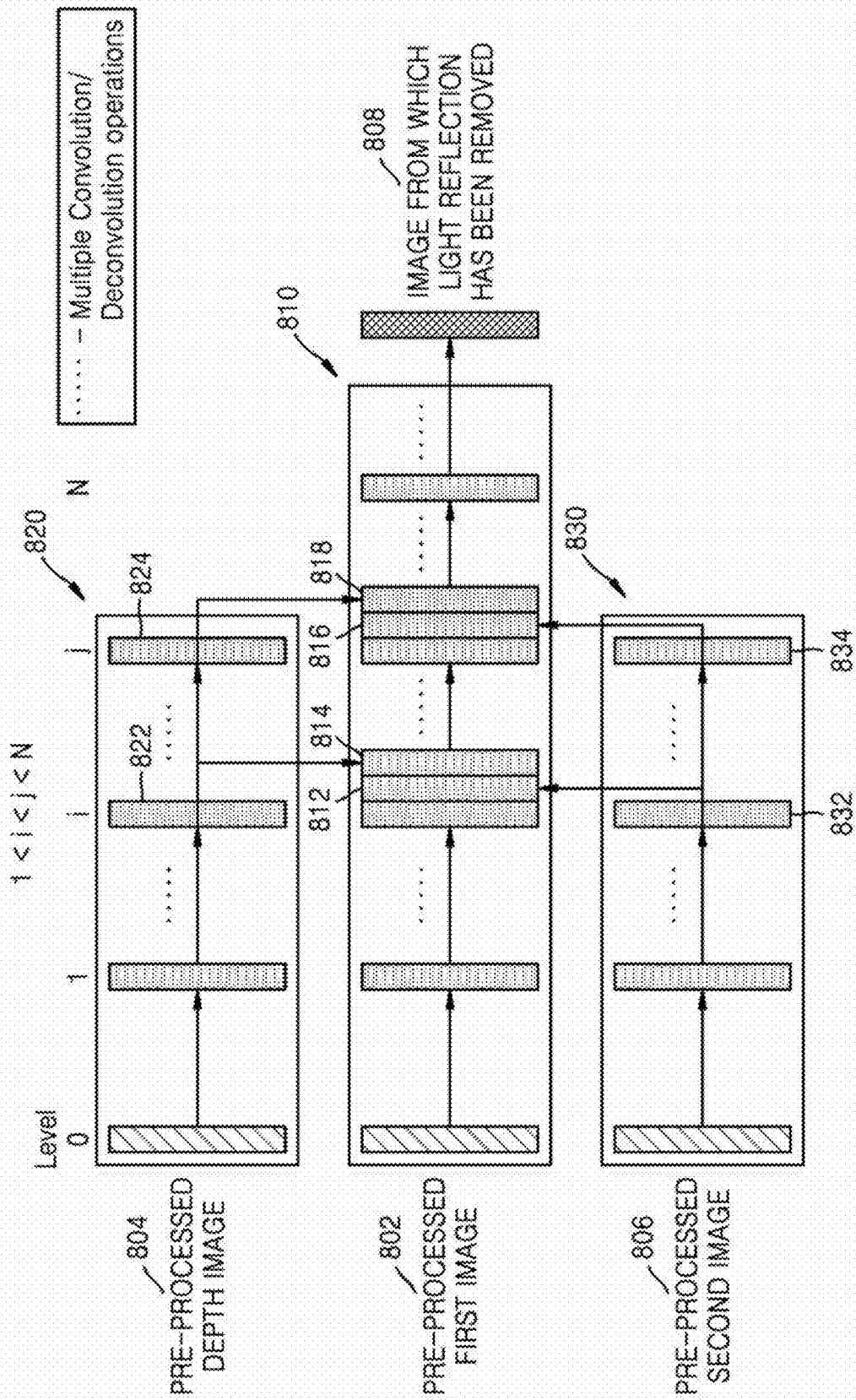
FIG. 8 is a view for describing a network structure of a light reflection removing model for generating an image from which light reflection has been removed, which is used by an electronic device according to an embodiment of the disclosure.

FIG. 8 is a view for describing a network structure of a light reflection removing model for generating an image from which light reflection has been removed, used by an electronic device according to an embodiment of the disclosure.

According to an embodiment of the disclosure, the light reflection removing model may be a neural network that receives a pre-processed first image 802, a pre-processed depth image 804, and a pre-processed second image 806, pre-processed, and outputs an image 808 from which light reflection has been removed. Alternatively or additionally, the light reflection removing model may be configured as a combination of one or more neural networks. For example, the light reflection removing model may be configured with a main model 810, a first sub model 820, and a second sub model 830. Each of the main model 810, the first sub model 820, and the second sub model 830 may include a plurality of neural network layers, and perform convolution operation or deconvolution operation using the plurality of neural network layers.

The main model 810, the first sub model 820, and the second sub model 830 may include or may be similar in many respects to at least one of the main model 252 and the main model 722, to at least one of the first sub model 254 and the first sub model 724, and to at least one of the second sub model 256 and the second sub model 726, respectively, described with reference to FIGS. 2 and 7, and may include additional features not mentioned above.

According to an embodiment of the disclosure, the main model 810, the first sub model 820, and the second sub model 830 may share a feature map. More specifically, a feature map output from at least some neural network layers of the first sub model 820 and a feature map output from at least some neural network layers of the second sub model 830 may be shared by the main model 810.

According to an embodiment of the disclosure, the main model 810 may include an addition layer.

For example, the main model 810 may include a first addition layer 812 and a second addition layer 814 in an i-th level of a network. In such an example, the first addition layer 812 may perform addition of a feature map output from an i-th level layer 832 of the second sub model 830. Alternatively or additionally, the second addition layer 814 may perform addition of a feature map output from an i-th level layer 822 of the first sub model 820.

In the same way, the main model 810 may include a third addition layer 816 and a fourth addition layer 818 in a j-th level of the network. In such an example, the third addition layer 816 may perform addition of a feature map output from a j-th level layer 834 of the second sub model 830. Alternatively or additionally, the fourth addition layer 818 may perform addition of a feature map output from a j-th level layer 824 of the first sub model 820.

The electronic device 2000, according to an embodiment of the disclosure, may generate the image 808 from which light reflection has been removed by fusing the pre-processed first image 802, the pre-processed depth image 804, and the pre-processed second image 806 using addition layers included in the main model 810.

Figure 9:
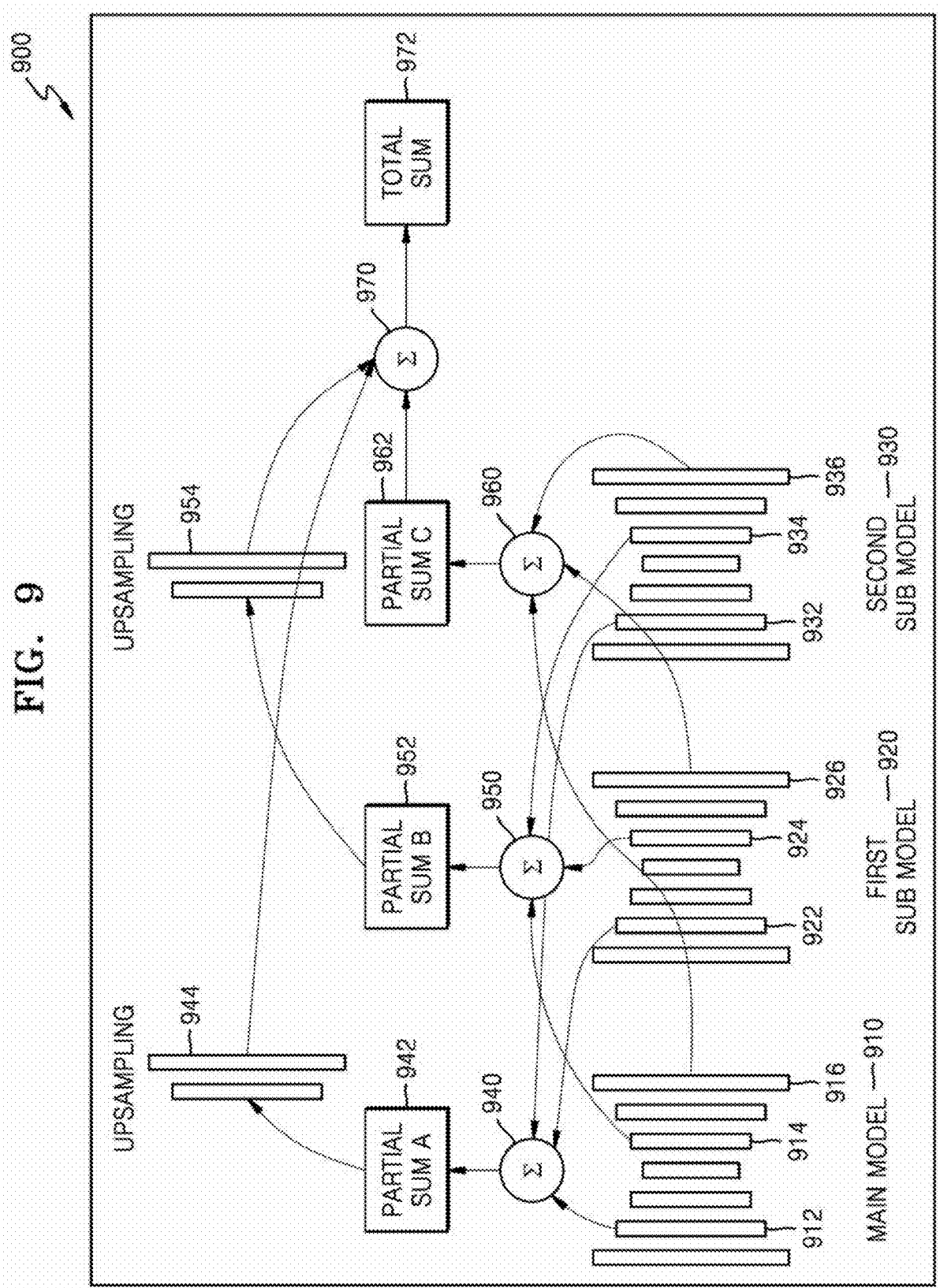
FIG. 9 is a view for describing another network structure of a light reflection removing model for generating an image from which light reflection has been removed, which is used by an electronic device according to an embodiment of the disclosure.

FIG. 9 is a view for describing another network structure of a light reflection removing model for generating an image from which light reflection has been removed, used by an electronic device according to an embodiment of the disclosure.

A block 900 of FIG. 9 illustrates a portion of a neural network of a light reflection removing model for outputting an image from which light reflection has been removed.

Referring to FIG. 9, the light reflection removing model for outputting an image from which light reflection has been removed may be configured as a combination of one or more neural networks. For example, the light reflection removing model may be configured with a main model 910, a first sub model 920, and a second sub model 930.

The main model 910 may include or may be similar in many respects to at least one of the main model 252, the main model 722, and the main model 810 described with reference to FIGS. 2, 7, and 8, and may include additional features not mentioned above. The first sub model 920 may include or may be similar in many respects to at least one of the first sub model 254, the first sub model 724, and the first sub model 820 described with reference to FIGS. 2, 7, and 8, and may include additional features not mentioned above. The second sub model 930 may include or may be similar in many respects to at least one of the second sub model 256, the second sub model 726, and the second sub model 830 described with reference to FIGS. 2, 7, and 8, and may include additional features not mentioned above.

Each of the main model 910, the first sub model 920, and the second sub model 930 may include a plurality of neural network layers, and perform convolution operations and/or deconvolution operations using the plurality of neural network layers. Alternatively or additionally, a neural network for outputting an image from which light reflection has been removed may include one or more addition layers. For example, the neural network for outputting an image from which light reflection has been removed may include a first addition layer 940, a second addition layer 950, a third addition layer 960, and a fourth addition layer 970.

According to an embodiment of the disclosure, a partial sum of feature maps output from at least some neural network layers included in the main model 910, the first sub model 920, and the second sub model 930 may be obtained.

For example, the first addition layer 940 may output a partial sum A 942 by summing a feature map output from an i-th level layer 912 of the main model 910, a feature map output from an i-th level layer 922 of the first sub model 920, and a feature map output from an i-th level layer 932 of the second sub model 930.

Alternatively or additionally, the second addition layer 950 may output a partial sum B 952 by summing a feature map output from a k-th level layer 914 of the main model 910, a feature map output from a k-th level layer 924 of the first sub model 920, and a feature map output from a k-th level layer 934 of the second sub model 930.

Alternatively or additionally, the third addition layer 960 may output a partial sum C 962 by summing a feature map output from an n-th level layer 916 of the main model 910, a feature map output from an n-th level layer 926 of the first sub model 920, and a feature map output from an n-th level layer 936 of the second sub model 930.

Alternatively or additionally, the fourth addition layer 970 may output a total sum 972 by summing the partial sum A 942, the partial sum B 952, and the partial sum C 962.

For example, a batch size of the partial sum A 942 may be smaller than a batch size of the partial sum C 962. According to an embodiment of the disclosure, the partial sum A 942 may be upsampled such that the batch size of the partial sum A 942 is identical to the batch size of the partial sum C 962. An upsampled partial sum A 944 may be input to the fourth addition layer 970.

Alternatively or additionally, a batch size of the partial sum B 952 may be smaller than a batch size of the partial sum C 962. According to an embodiment of the disclosure, the partial sum B 952 may be upsampled such that the batch size of the partial sum B 952 is identical to the batch size of the partial sum C 962. An upsampled partial sum B 954 may be input to the fourth addition layer 970.

The electronic device 2000, according to an embodiment of the disclosure, may generate an image from which light reflection has been removed by fusing the first image, the depth image, and the second image using the addition layers included in the light reflection removing model for outputting an image from which light reflection has been removed.

Figure 10:
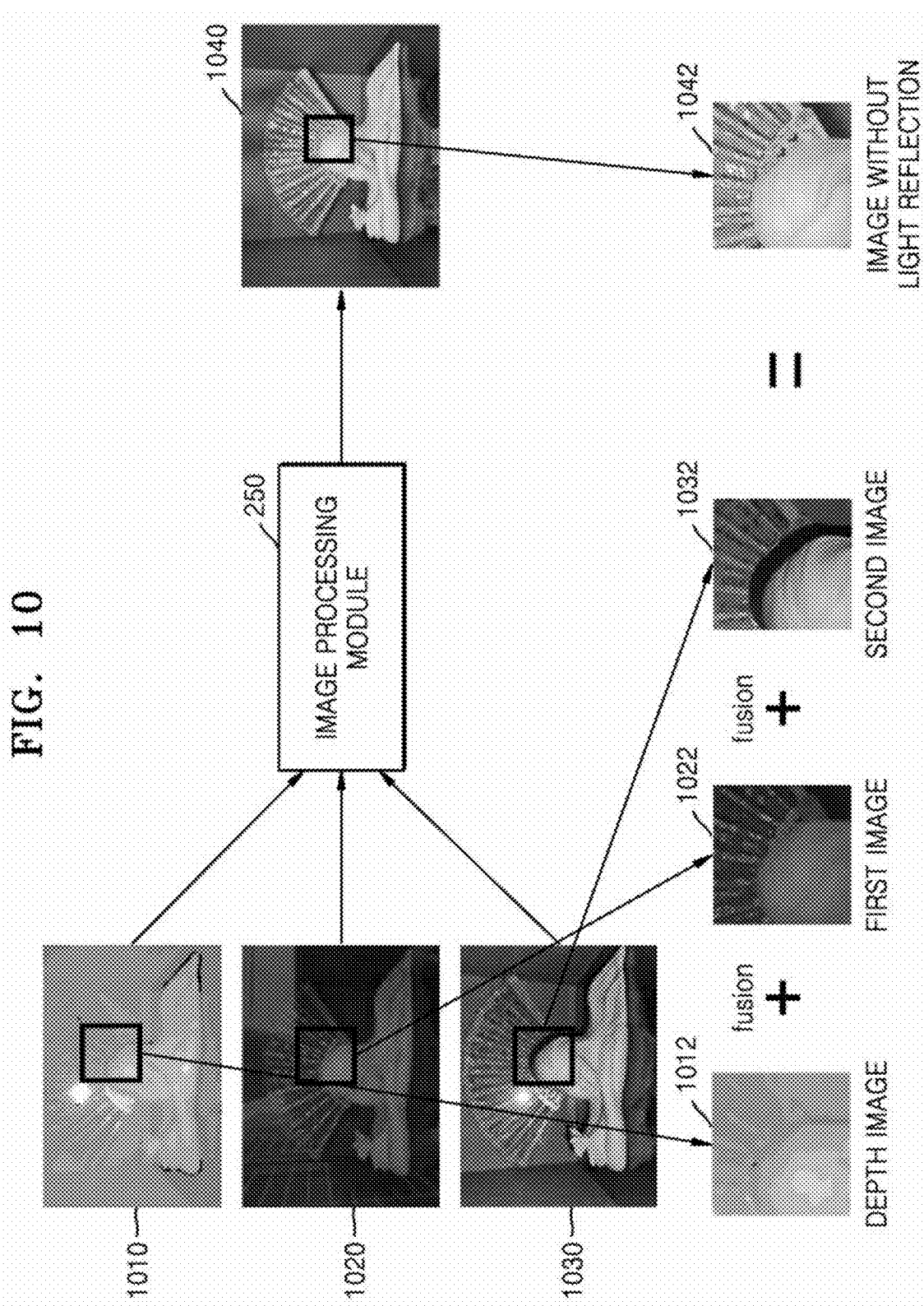
FIG. 10 is a view for describing an example, performed by an electronic device according to an embodiment of the disclosure, for obtaining an image from which light reflection has been removed using a first image, a depth image, and a second image.

FIG. 10 is a view for describing an example, performed by an electronic device according to an embodiment of the disclosure, for obtaining an image from which light reflection has been removed using a first image, a depth image, and a second image.

Referring to FIG. 10, pre-processing may be performed on each of a depth image 1010, a first image 1020, and a second image 1030, according to the above-described embodiments of the disclosure. Accordingly, a plurality of first pixels of the first image 1020, a plurality of second pixels of the second image 1030, and a plurality of third pixels of the depth image 1010 may be matched with each other.

The electronic device 2000, according to an embodiment of the disclosure, may generate an image 1040 from which light reflection has been removed using at least one part of the depth image 1010, the first image 1020, and the second image 1030.

Hereinafter, for convenience of description, an embodiment for generating the image 1040 from which light reflection has been removed by fusing the first image 1020, the second image 1030, and the depth image 1010 based on some areas of the first image 1020, the second image 1030, and the depth image 1010, of which pixels are matched with each other, is described.

According to an embodiment of the disclosure, the electronic device 2000 may obtain an area 1042 of the image 1040 from which light reflection has been removed by fusing an area 1012 of the depth image 1010, an area 1022 of the first image 1020, and an area 1032 of the second image 1030 using the image processing module 250. For example, pixels included in the area 1012 of the depth image 1010 may have greater pixel values in correspondence to shorter distances to a subject from the electronic device 2000. Alternatively or additionally, pixels included in the area 1022 of the first image 1020 may have low contrasts of pixel values at detailed portions of the subject due to a small quality of light irradiated to the subject. Alternatively or additionally, pixels included in the area 1032 of the second image 1030 may have high contrasts of pixel values at detailed portions of the subject due to a large quantity of light irradiated to the subject because the subject has been photographed in an activated state of the flash. However, a shadow may exist in the area 1032 of the second image 1030 due to the flash.

According to an embodiment of the disclosure, the electronic device 2000 may obtain an area 1042 of an image from which light reflection has been removed, the area 1042 configured with pixels having high contrasts at the detailed portions of the subject while having no light reflection, by fusing the area 1012 of the depth image 1010, the area 1022 of the first image 1020, and the area 1032 of the second image 1030 using the image processing module 250.

According to another embodiment of the disclosure, the electronic device 2000 may identify an area having light reflection that is greater than or equal to a preset reflection criterion, from the second image 1030. The electronic device 2000 may determine an image that is to be used for generating an image from which light reflection has been removed, based on a degree of light reflection in the image. For example, the electronic device 2000 may determine that light reflection at the area 1032 of the second image 1030 is lower than the preset reflection criterion, and may select, as images that are to be used to generate the area 1042 of the image from which light reflection has been removed, the area 1012 of the depth image 1010, the area 1022 of the first image 1020, and the area 1032 of the second image 1030. According to another example, the electronic device 2000 may determine that light reflection at the area 1032 of the second image 1030 is lower than the preset reflection criterion, and may select, as images that are to be used to generate the area 1042 of the image from which light reflection has been removed, the area 1022 of the first image 1020 and the area 1032 of the second image 1030. After the area 1022 of the first image 1020 and the area 1032 of the second image 1030 are selected as images that are to be used to generate the area 1042 of the image from which light reflection has been removed, the electronic device 2000 may obtain the area 1042 of the image from which light reflection has been removed by fusing the area 1022 of the first image 1020 and the area 1032 of the second image 1030 using the image processing module 250.

The electronic device 2000, according to an embodiment of the disclosure, may generate an image from which light reflection has been removed by sharing feature maps extracted from the first image 1020, the depth image 1010, and the second image 1030 in at least some convolution layers among convolution layers included in a main model, a first sub model, and a second sub model and fusing the first image 1020, the depth image 1010, and the second image 1030 using the image processing module 250.

Figure 11:
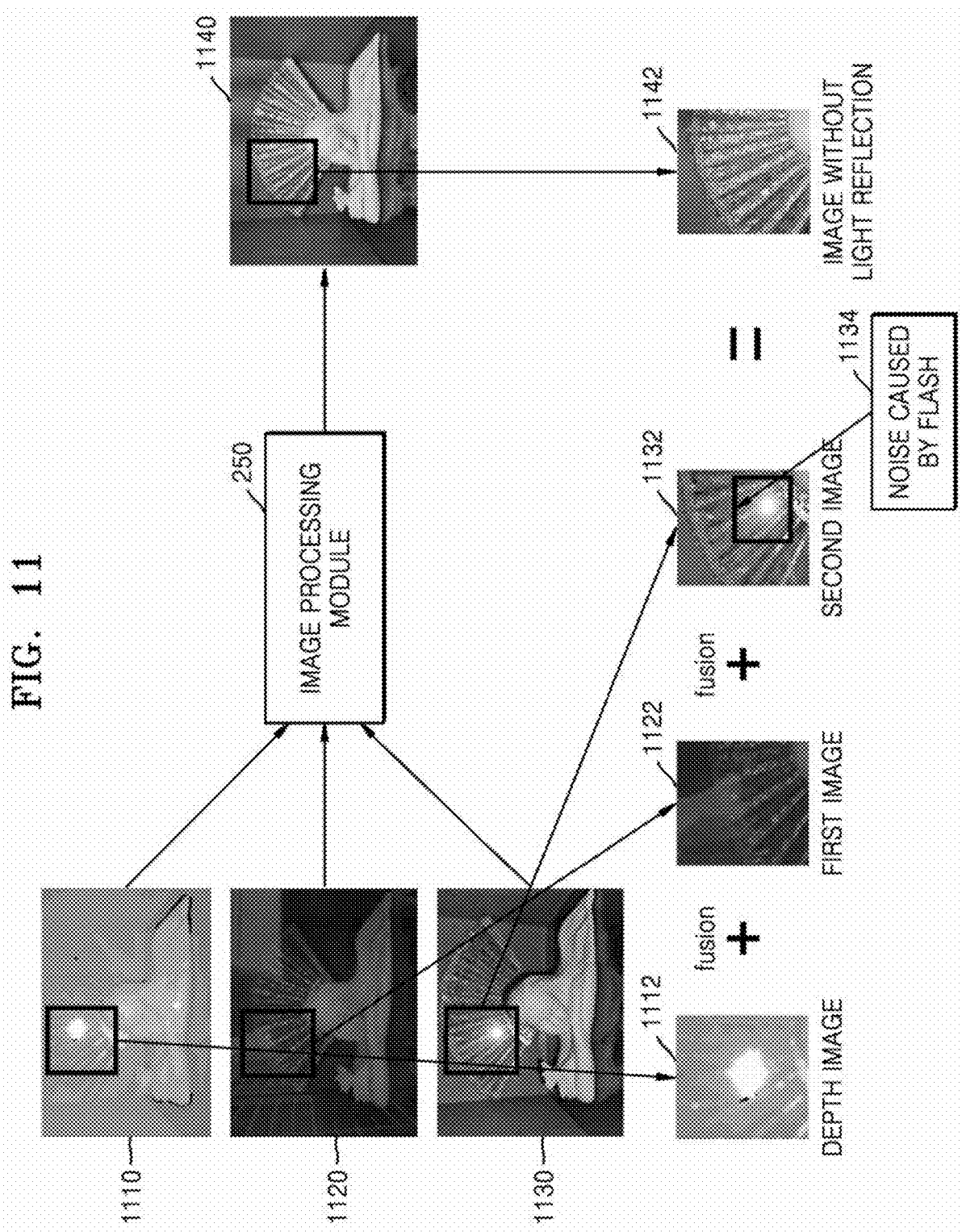
FIG. 11 is a view for describing another example, performed by an electronic device according to an embodiment of the disclosure, for obtaining an image from which light reflection has been removed using a first image, a depth image, and a second image.

FIG. 11 is a view for describing another example, performed by an electronic device according to an embodiment of the disclosure, for obtaining an image from which light reflection has been removed using a first image, a depth image, and a second image.

Referring to FIG. 11, a depth image 1110, a first image 1120, and a second image 1130 may be pre-processed according to the above-described embodiments of the disclosure. Accordingly, a plurality of first pixels of the first image 1120, a plurality of second pixels of the second image 1130, and a plurality of third pixels of the depth image 1110 may be matched with each other.

The electronic device 2000, according to an embodiment of the disclosure, may generate an image 1140 from which light reflection has been removed using at least one part of the depth image 1110, the first image 1120, and the second image 1130.

Hereinafter, for convenience of description, an embodiment for generating an image 1140 from which light reflection has been removed by fusing the first image 1120, the second image 1130, and the depth image 1110 based on areas of the first image 1120, the second image 1130, and the depth image 1110, of which pixels are matched with each other, is described.

According to an embodiment of the disclosure, the electronic device 2000 may obtain an area 1142 of the image 1140 from which light reflection has been removed by fusing an area 1112 of the depth image 1110, an area 1122 of the first image 1120, and an area 1132 of the second image 1130 using the image processing module 250. For example, pixels included in the area 1112 of the depth image 1110 may have greater pixel values in correspondence to a shorter distance to a subject from the electronic device 2000. Alternatively or additionally, pixels included in the area 1122 of the first image 1120 may have low contrasts of pixel values at detailed portions of the subject due to a small quantity of light irradiated to the subject. Alternatively or additionally, pixels included in the area 1132 of the second image 1030 may include noise 1134 caused by the flash because the subject has been photographed in an activated state of the flash.

The electronic device 2000, according to an embodiment of the disclosure, may obtain the area 1142 of the image 1140 from which light reflection has been removed, the area 1142 configured with pixels having high contrasts at the detailed portions of the subject while having no light reflection, by fusing the area 1112 of the depth image 1110, the area 1122 of the first image 1120, and the area 1132 of the second image 1130 using the image processing module 250.

According to an embodiment of the disclosure, the electronic device 2000 may identify an area having light reflection that is greater than or equal to the preset reflection criterion, from the second image 1130. The electronic device 2000 may determine an image that is to be used for generating an image from which light reflection has been removed, based on a degree of light reflection in the image. For example, the electronic device 2000 may determine that light reflection at the area 1132 of the second image 1130 is more than the preset reflection criterion. In such an example, an area in which light reflection is more than the preset reflection criterion in the area 1132 of the second image 1130 may include noise 1134 caused by the flash. The electronic device 2000 may select, as images that are to be used for generating the area 1142 of the image 1140 from which light reflection has been removed, the area 1112 of the depth image 1110 and the area 1122 of the first image 1120. After the electronic device 2000 selects, as images that are to be used for generating the area 1142 of the image 1140 from which light reflection has been removed, the area 1112 of the depth image 1110 and the area 1122 of the first image 1120, the electronic device 2000 may obtain the area 1142 of the image 1140 from which light reflection has been removed by fusing the area 1112 of the depth image 1110 and the area 1122 of the first image 1120 using the image processing module 250.

The electronic device 2000, according to an embodiment of the disclosure, may generate an image from which light reflection has been removed, by sharing feature maps extracted from the first image 1120, the depth image 1110, and the second image 1130 in at least some convolution layers among convolution layers included in a main model, a first sub model, and a second sub model and fusing the first image 1120, the depth image 1110, and the second image 1130 using the image processing module 250.

Figure 12:
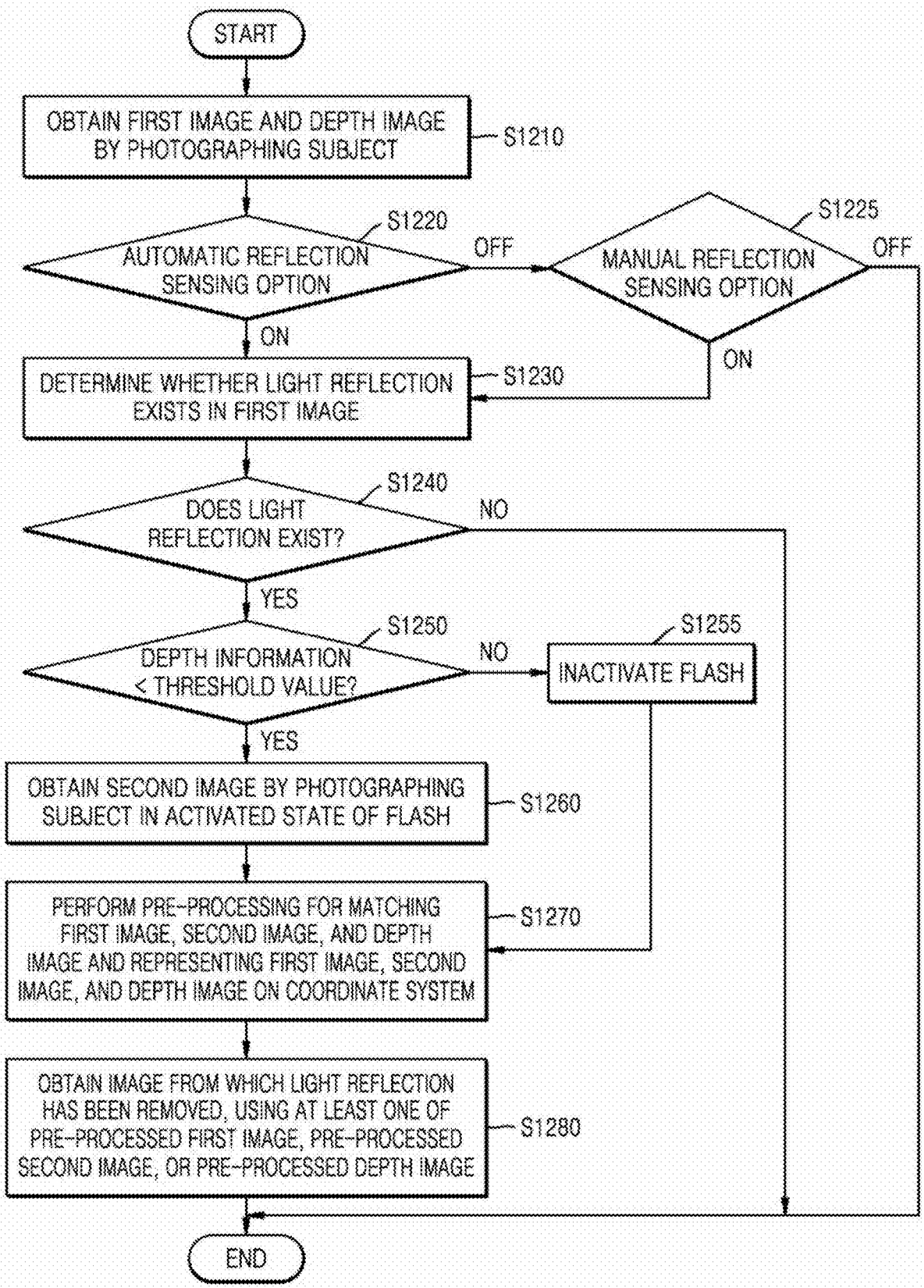
FIG. 12 is a flowchart illustrating a method, performed by an electronic device according to an embodiment of the disclosure, of obtaining an image from which light reflection has been removed.

FIG. 12 is a flowchart illustrating a method, performed by an electronic device according to an embodiment of the disclosure, of obtaining an image from which light reflection has been removed.

In operation S1210, the electronic device 2000, according to an embodiment of the disclosure, may obtain a first image and a depth image by photographing a subject. The electronic device 2000 may obtain the first image using a RGB camera, and obtain the depth image using a depth camera.

In operation S1220, the electronic device 2000, according to an embodiment of the disclosure, may identify whether an automatic reflection sensing option is in a turned-on (e.g., enabled, active) state or in a turned-off (e.g., disabled, inactive) state.

According to an embodiment of the disclosure, when the automatic reflection sensing option for automatically identifying whether light reflection exists in the first image is in a turned-on state, the electronic device 2000 may perform operation S1230. Alternatively or additionally, when the automatic reflection sensing option is in a turned-off state, the electronic device 2000 may perform operation S1225.

In operation S1225, the electronic device 2000, according to an embodiment of the disclosure, may identify whether a manual reflection sensing option is in a turned-on (e.g., enabled, active) state or in a turned-off (e.g., disabled, inactive) state.

According to an embodiment of the disclosure, a user of the electronic device 2000 may make a user input of turning on the manual reflection sensing option to determine whether light reflection exists in the first image. When the manual reflection sensing option is turned on, the electronic device 2000 may receive a user input indicating whether light reflection exists in the first image. When the user input indicates that light reflection exists in the first image, the electronic device 2000 may perform operation S1230. Alternatively or additionally, when the manual reflection sensing option is in the turned-off state or when the user input indicates that light reflection does not exist in the first image, the method ends.

In operation S1230, the electronic device 2000, according to an embodiment of the disclosure, may determine whether light reflection exists in the first image.

According to an embodiment of the disclosure, the electronic device 2000 may apply the first image to a light reflection detecting model to determine whether light reflection exists in the first image.

According to another embodiment of the disclosure, the electronic device 2000 may determine whether light reflection exists in the first image based on the user input received, in operation S1225, that indicates whether light reflection exists in the first image.

According to another embodiment of the disclosure, the electronic device 2000 may apply the first image and the depth image to the light reflection detecting model to determine whether light reflection exists in the first image.

A method, performed by the electronic device 2000, according to an embodiment of the disclosure, of determining whether light reflection exists in the first image using the light reflection detecting model has been described above with reference to FIG. 3, and therefore, overlapping descriptions thereof are omitted.

In operation S1240, the electronic device 2000, according to an embodiment of the disclosure, may perform operation S1250 when the electronic device 2000 determines, in operation S1230, that light reflection exists in the first image. Alternatively or additionally, when the electronic device 2000 determines, in operation S1230, that light reflection does not exist in the first image, the method ends.

In operation S1250, the electronic device 2000, according to an embodiment of the disclosure, may compare depth information with the depth threshold value. A method, performed by the electronic device 2000, of obtaining depth information indicating a distance from the electronic device 2000 to a subject has been described above with reference to FIG. 4, and therefore, overlapping descriptions thereof are omitted. When the depth information is greater than or equal to the depth threshold value, the electronic device 2000 may perform operation S1255. Alternatively or additionally, when the depth information is smaller than the depth threshold value, the electronic device 2000 may perform operation S1260.

In operation S1255, the electronic device 2000, according to an embodiment of the disclosure, may inactivate the flash. That is, a second image which is obtained by photographing the subject in an activated state of the flash may be not obtained.

In operation S1260, the electronic device 2000, according to an embodiment of the disclosure may obtain a second image by photographing the subject in the activated state of the flash.

In operation S1270, the electronic device 2000, according to an embodiment of the disclosure, may perform pre-processing for matching the first image, the second image, and the depth image and representing a result of the matching on a coordinate system. The electronic device 2000 may project the first image, the second image, and the depth image onto a common image plane, to match pixels representing the same location of an actual real space among pixels included in the first image, the second image, and the depth image. For example, the electronic device 2000 may project the first image, the second image, and the depth image onto the common image plane by rotating and twisting each of the first image, the second image, and the depth image on a three-dimensional space. The electronic device 2000, according to an embodiment of the disclosure. may match a plurality of first pixels of the first image, a plurality of second pixels of the second image, and a plurality of third pixels of the depth image. When the electronic device 2000 matches corresponding points that are pixels representing the same location of an actual real space, the electronic device 2000 may use an epipolar constraint. The operation has been described above with reference to FIG. 6, and therefore, overlapping descriptions thereof are omitted.

According to an embodiment of the disclosure, when the electronic device 2000 obtains no second image in operation S1255, the electronic device 2000 may perform pre-processing on the first image and the depth image.

In operation S1280, the electronic device 2000, according to an embodiment of the disclosure, may obtain an image from which light reflection has been removed, using at least one of the pre-processed first image, the pre-processed second image, or the pre-processed depth image.

The electronic device 2000 may obtain the image from which light reflection has been removed using one or more AI models.

For example, the electronic device 2000 may apply the first image, the depth image, and the second image to an AI model configured as a combination of a main model, a first sub model, and a second sub model, and obtain an image from which light reflection has been removed and which is output from the AI model.

According to another example, the electronic device 2000 may apply the first image to the main model, apply the depth image to the first sub model, and apply the second image to the second sub model. In such an example, data output from the first sub model and data output from the second sub model may be input to the main model. The electronic device 2000 may obtain the image from which light reflection has been removed and which is output from the main model.

According to an embodiment of the disclosure, when the electronic device 2000 obtains no second image, the electronic device 2000 may obtain an image from which light reflection has been removed, using the first image and the depth image. That is, the electronic device 2000 may obtain the image from which light reflection has been removed, using the main model and the first sub model.

Figure 13:
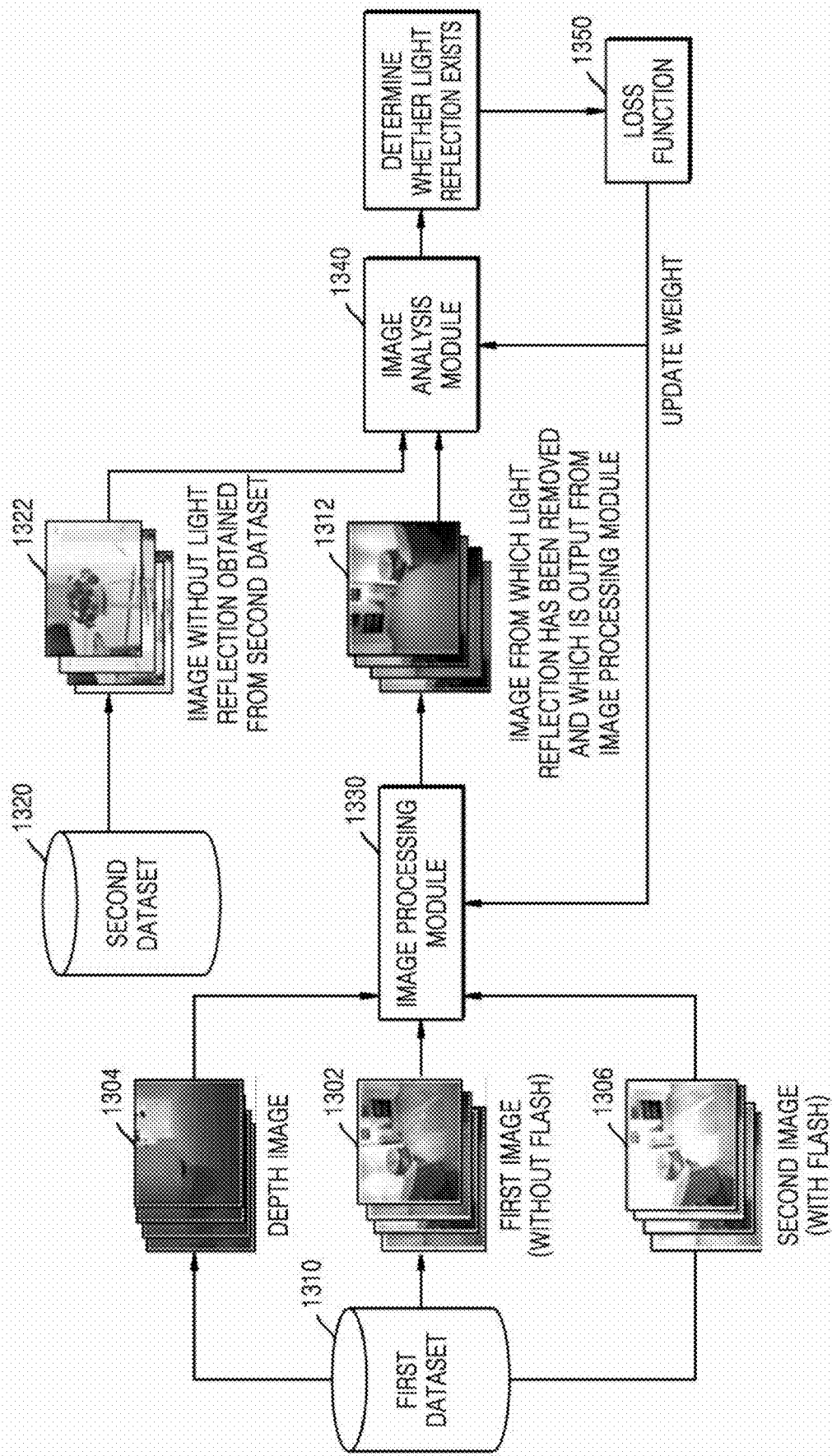
FIG. 13 is a view for describing a method, performed by an electronic device according to an embodiment of the disclosure, of training an artificial intelligence (AI) model of an image processing module to obtain an image from which light reflection has been removed.

FIG. 13 is a view for describing a method, performed by an electronic device according to an embodiment of the disclosure, of training an AI model of an image processing module to obtain an image from which light reflection has been removed.

In the following description related to FIG. 13, a first dataset 1310 may be a dataset configured with depth images, first images, and second images, in which light reflection exists. Alternatively or additionally, a second dataset 1320 may be a dataset configured with images in which no light reflection exists.

The electronic device 2000, according to an embodiment of the disclosure, may obtain a first image 1302, a depth image 1304, and a second image 1306 from the first dataset 1310.

The electronic device 2000 may obtain the first image 1302, the depth image 1304, and the second image 1306 one by one from among images included in the first dataset 1310. For example, the first image 1302, the depth image 1304, and the second image 1306 may be images obtained by photographing the same real space and the same subject to enable image synthesis.

The electronic device 2000 may apply the first image 1302, the depth image 1304, and the second image 1306 to an image processing module 1330, and obtain an image 1312 from which light reflection has been removed and which is output from the image processing module 1330.

The electronic device 2000 may label (e.g., with a label value '1') the image 1312 from which light reflection has been removed and which is output from the image processing module 1330. For example, the label value '1' may correspond to a class of an 'image without light reflection'.

The electronic device 2000 may analyze the image 1312 from which light reflection has been removed, the image 1312 labeled with a label value '1' and output from the image processing module 1330, using an image analysis module 1340. For example, the image analysis module 1340 may include an AI model for determining whether light reflection exists in an input image. The AI model included in the image analysis module 1340 may be trained based on the image 1312 from which light reflection has been removed and which is output from the image processing module 1330, and an image 1322 without light reflection obtained from the second dataset 1320. The operation is described in more detail with reference to FIG. 14.

The electronic device 2000 may apply the image 1312 from which light reflection has been removed and which is output from the image processing module 1330, to the image analysis module 1340, and determine whether light reflection exists with respect to the image 1312 without light reflection output from the image processing module 1330, thereby calculating a loss function 1350 of the AI model included in the image analysis module 1340. The electronic device 2000 may update a weight of an AI model in the image processing module 1330 based on a loss value of the loss function 1350.

It is to be understood that the present disclosure is not limited to the example label values and example classes described herein and that different and/or additional label values and/or classes may be used without deviating from the scope of the present disclosure.

Figure 14:
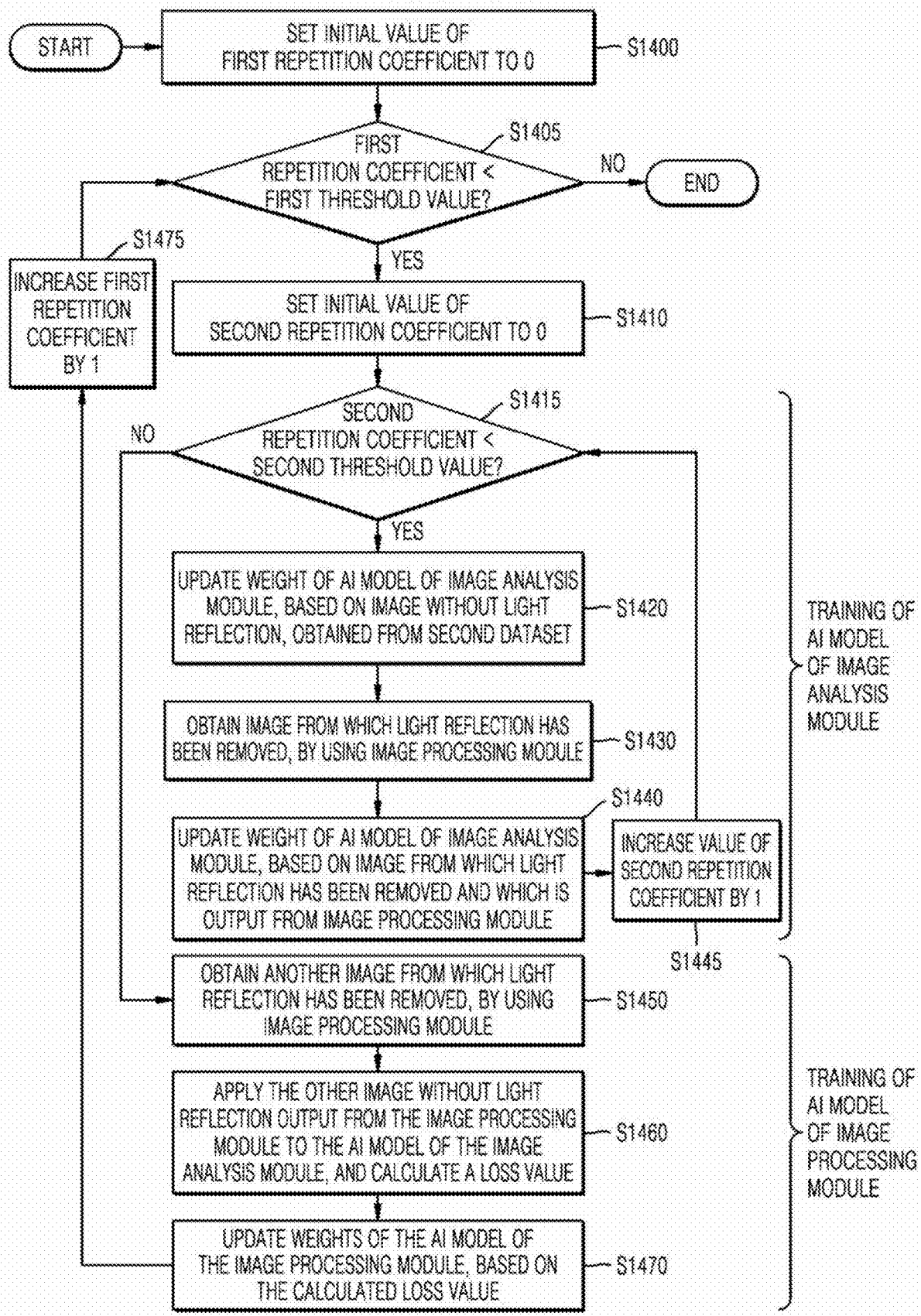
FIG. 14 is a flowchart for describing a method, performed by an electronic device according to an embodiment of the disclosure, of training an AI model of an image processing module and an AI model of an image analysis module illustrated in FIG. 13.

FIG. 14 is a flowchart for describing a method, performed by an electronic device according to an embodiment of the disclosure, of training an AI model of an image processing module and an AI model of an image analysis module illustrated in FIG. 13.

A training method of the AI model of the image processing module 1330 and the AI model of the image analysis module 1340, as described above with reference to FIG. 13, is described in detail with reference to FIG. 14.

According to an embodiment of the disclosure, the AI model of the image processing module 1330 and the AI model of the image analysis module 1340 may be implemented by a generative adversarial networks (GAN) method. For example, a generator for generating an image from which light reflection has been removed may correspond to the AI model of the image processing module 1330, and a discriminator for discriminating an image without light reflection may correspond to the AI model of the image analysis module 1340.

In the following description related to FIG. 14, an image without light reflection, obtained from the second dataset 1320, may be an image without light reflection, obtained from the second dataset 1320 configured with images without actual light reflection. Alternatively or additionally, an image from which light reflection has been removed, output from the image processing module 1330, may be an image obtained by removing light reflection from an image with actual light reflection through the image processing module 1330. For example, the image from which light reflection has been removed, output from the image processing module 1330, may have characteristics that are different from those of an image without light reflection obtained from the second dataset 1320, due to light reflection existing in some areas although light reflection has been removed by the image processing module 1330.

In operation S1400, the electronic device 2000, according to an embodiment of the disclosure, may set an initial value of a first repetition coefficient (e.g., zero (0)). Herein, the first repetition coefficient may refer to the number of repetitions by which the electronic device 2000 repeatedly performs training of the AI model of the image analysis module 1340 and training of the AI model of the image processing module 1330.

In operation S1405, the electronic device 2000, according to an embodiment of the disclosure, may determine whether the first repetition coefficient reaches a first repetition threshold value. According to an embodiment of the disclosure, when the number of repetitions is smaller than the first repetition threshold value, the electronic device 2000 may perform operation S1410.

In operation S1410, the electronic device 2000, according to an embodiment of the disclosure, may set an initial value of a second repetition coefficient (e.g., zero (0)). Herein, the second repetition coefficient may refer to the number of repetitions for training of the AI model of the image analysis module 1340.

In operation S1415, the electronic device 2000, according to an embodiment of the disclosure, may determine whether the second repetition coefficient is smaller than a second repetition threshold value. When the second repetition coefficient is smaller than the second repetition threshold value, the electronic device 2000 may repeatedly perform operations S1420 to S1445. Alternatively or additionally, when the second repetition coefficient is greater than or equal to the second repetition threshold value, the electronic device 2000 may perform operation S1450.

Operations S1420 to S1445 may be operations for training the AI model of the image analysis module 1340.

In operation S1420, the electronic device 2000, according to an embodiment of the disclosure, may update a weight of the AI model of the image analysis module 1340, based on an image without light reflection, obtained from the second dataset 1320. The electronic device 2000 may label with a label value (e.g., '1') the image without light reflection obtained from the second dataset 1320. The electronic device 2000 may train the AI model of the image analysis module 1340, based on the image without light reflection obtained from the second dataset 1320. For example, the label value '1' may correspond to a class of an 'image without light reflection'.

In operation S1430, the electronic device 2000, according to an embodiment of the disclosure may obtain an image from which light reflection has been removed, using the image processing module 1330. The electronic device 2000 may obtain a first image, a second image, and a depth image, and then obtain an image from which light reflection has been removed, output from the image processing module 1330, according to the above-described embodiments of the disclosure.

In operation S1440, the electronic device 2000, according to an embodiment of the disclosure, may update a weight of the AI model of the image analysis module 1340, based on the image from which light reflection has been removed, output from the image processing module 1330. According to an embodiment of the disclosure, the image from which light reflection has been removed, output from the image processing module 1330, may include light reflection remaining in some areas although light reflection has been removed by the image processing module 1330. The electronic device 2000 may label, with a label value '0', the image from which light reflection has been removed and which is output from the image processing module 1330. The electronic device 2000 may train the AI model of the image analysis module 1340, based on the image from which light reflection has been removed and which is output from the image processing module 1330. For example, the label value '0' may correspond to a class of an 'image with light reflection'.

In operation S1445, the electronic device 2000, according to an embodiment of the disclosure, may increase a value of the second repetition coefficient by 1. By increasing the value of the second repetition coefficient by 1, performing operation S1415, and repeatedly performing operations S1420 and S1430 when the second repetition coefficient is smaller than the second repetition threshold value, the electronic device 2000 may train the AI model of the image analysis module 1340.

In operation S1415, when the second repetition coefficient is greater than or equal to the second repetition threshold value, the electronic device 2000, according to an embodiment of the disclosure, may perform operation S1450.

In operation S1450, the electronic device 2000, according to an embodiment of the disclosure, may obtain another image from which light reflection has been removed, using the image processing module 1330. Herein, the image from which light reflection has been removed and which is output from the image processing module 1330 may be different from the image from which light reflection has been removed and which is obtained in operation S1430. The electronic device 2000 may obtain another first image, another depth image, and another second image from the first dataset 1310, and apply the other first image, the other depth image, and the other second image to the image processing module 1330, thereby obtaining another image from which light reflection has been removed.

According to an embodiment of the disclosure, the electronic device 2000 may train the AI model of the image processing module 1330. The electronic device 2000 may update weights of the AI model of the image processing module 1330 such that an image from which light reflection has been removed and which is output from the image processing module 1330, is identified as an 'image without light reflection' by the AI module of the image analysis module 1340 by removing light reflection in the image. The electronic device 2000 may label, with a label value '1', the other image from which light reflection has been removed and which is output from the image processing module 1330. For example, the label value '1' may correspond to a class of an 'image without light reflection'.

In operation S1460, the electronic device 2000, according to an embodiment of the disclosure, may apply the other image without light reflection output from the image processing module 1330 to the AI model of the image analysis module 1340, and calculate a loss value.

In operation S1470, the electronic device 2000, according to an embodiment of the disclosure, may update weights of the AI model of the image processing module 1330, based on the calculated loss value.

By repeatedly performing operations S1405 to S1470 of FIG. 14, the AI model of the image processing module 1330 and the AI model of the image analysis module 1340 may be trained. Accordingly, the AI model of the image processing module 1330 may generate images from which light reflection has been more completely removed, and the AI model of the image analysis module 1340 may more accurately discriminate images without light reflection from images with light reflection. When the AI model of the image analysis module 1340 does no longer discriminate images from which light reflection has been removed and which are output from the image processing module 1330, from images without light reflection, training of the AI model of the image analysis module 1340 and the AI model of the image processing module 1330 may terminate.

It is to be understood that the present disclosure is not limited to the example label values and example classes described herein and that different and/or additional label values and/or classes may be used without deviating from the scope of the present disclosure.

Figure 15:
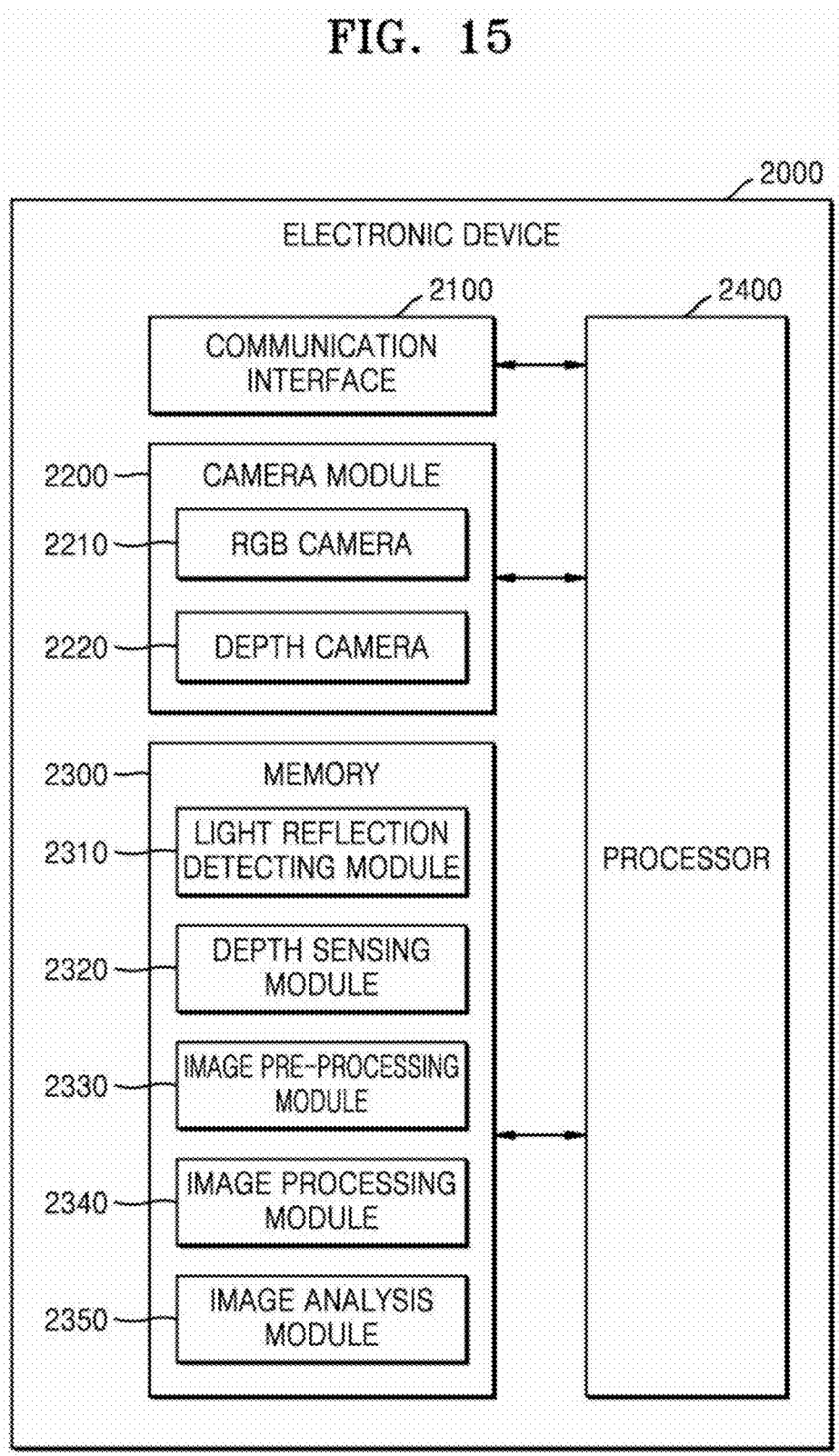
FIG. 15 is a block diagram illustrating a configuration of an electronic device according to an embodiment of the disclosure.

FIG. 15 is a block diagram illustrating a configuration of an electronic device according to an embodiment of the disclosure.

Referring to FIG. 15, the electronic device 2000, according to an embodiment of the disclosure, may include a communication interface 2100, a camera module 2200, a memory 2300, and a processor 2400.

The communication interface 2100 may perform data communication with a server (not shown) according to a control by the processor 2400. Alternatively or additionally, the communication interface 2100 may perform data communication with other surrounding electronic devices (not shown), as well as a server (not shown).

The communication interface 2100 may perform data communication with a server or other surrounding electronic devices using at least one of data communication methods including, for example, a wired local area network (LAN), a wireless LAN, wireless-fidelity (Wi-Fi), Bluetooth, zigbee, Wi-Fi direct (WFD), infrared data association (IrDA), Bluetooth low energy (BLE), near field communication (NFC), Wireless Broadband (WiBro), World Interoperability for Microwave Access (WiMAX), Shared Wireless Access Protocol (SWAP), Wireless Gigabit Alliance (WiGig), or radio frequency (RF) communication.

The communication interface 2100, according to an embodiment of the disclosure, may transmit/receive data for obtaining an image from which light reflection has been removed to/from an external device (not shown). For example, the communication interface 2100 may receive a light reflection detection model, a main model, a first sub model, a second sub model, etc., trained to obtain an image from which light reflection has been removed, from an external server (not shown).

The camera module 2200 may photograph a subject according to a control by the processor 2400. The camera module 2200 may include a RGB camera 2210 and a depth camera 2220. The RGB camera 2210 and the depth camera 2220 may be one or more cameras.

The RGB camera 2210 may photograph the subject. The processor 2500 may control the RGB camera 2210 to obtain a first image resulting from photographing the subject in an inactivated state of the flash and a second image resulting from photographing the subject in an activated state of the flash.

The depth camera 2220 may obtain a depth image by photographing the subject. The depth image may include data related to depth information indicating a distance from the electronic device 2000 to the subject. For example, pixels in the depth image may be an image having greater pixel values in correspondence to shorter distances from the electronic device 2000 to the subject. The depth camera 2220 may include a ToF camera, a RGB-Depth camera, etc., although not limited thereto.

The memory 2300 may store instructions that are readable by the processor 2400, a data structure, and program codes. In embodiments of the disclosure, operations that are performed by the processor 2400 may be implemented by executing instructions or codes of programs stored in the memory 2300.

The memory 2300 may include a non-volatile memory including at least one of a flash memory type, a hard disk type, a multimedia card micro type, card type memory (for example, secure digital (SD) or extreme digital (XD) memory), read-only memory (ROM), electrically erasable programmable read-only memory (EEPROM), programmable read-only memory (PROM), magnetic memory, a magnetic disk, or an optical disk, and a volatile memory, such as random access memory (RAM) and static random access memory (SRAM).

The memory 2300, according to an embodiment of the disclosure, may store various kinds of data that is usable to obtain an image from which light reflection has been removed. For example, a light reflection detecting module 2310, a depth sensing module 2320, an image pre-processing module 2330, an image processing module 2340, and an image analysis module 2350 may be stored in the memory 2300.

According to an embodiment of the disclosure, the light reflection detecting module 2310 may include a light reflection detecting module for determining whether light reflection exists in an image.

According to an embodiment of the disclosure, the image processing module 2340 may include an AI model for removing light reflection existing in an image by fusing images. For example, the image processing module 2340 may include a main model for receiving a first image and outputting an image from which light reflection has been removed, a first sub model for receiving a depth image and outputting a feature map to the main model, and a second sub model for receiving a second image and outputting a feature map to the main model.

According to an embodiment of the disclosure, the image analysis module 2350 may include an image-without-light-reflection identifying model for identifying an image without light reflection.

The processor 2400 may control overall operations of the electronic device 2000. For example, the processor 2400 may control overall operations of the communication interface 2100, the camera module 2200, etc. by executing one or more instructions of programs stored in the memory 2300.

The processor 2400 may be configured as at least one of a central processing unit (CPU), a microprocessor, a graphic processing unit (GPU), application specific integrated circuits (ASICs), digital signal processors (DSPs), digital signal processing devices (DSPDs), programmable logic devices (PLDs), field programmable gate arrays (FPGAs), an application processor (AP), a neural processing unit, or an AI-dedicated processor designed as a hardware structure specialized for processing an AI model, although not limited thereto.

According to an embodiment of the disclosure, the processor 2400 may determine whether light reflection exists in an image by executing the light reflection detecting module 2310. The processor 2400 may receive an image and determine whether light reflection exists in the received image, using the light reflection detecting model of the light reflection detecting module 2310. The processor 2400 may receive an image, and classify the image into one of two kinds of classes of 'presence of light reflection' or 'absence of light reflection'.

For example, the light reflection detecting model may receive at least one image of a first image, a second image, and a depth image, and output light reflection information representing whether light reflection exists in the received image.

The processor 2400 may determine whether to generate an image from which light reflection has been removed, based on the light reflection information obtained from the light reflection detecting module 2310. For example, when the processor 2400 determines that light reflection exists in the first image, the electronic device 2000 may perform operations for removing light reflection, according to the above-described embodiments of the disclosure.

According to an embodiment of the disclosure, the processor 2400 may obtain depth information indicating a distance from the electronic device 2000 to a subject by executing the depth sensing module 2320. The processor 2400 may determine whether to obtain a second image by photographing the subject in an activated state of the flash, based on the depth information obtained from the depth sensing module 2320. For example, when the distance from the electronic device 2000 to the subject is smaller than the depth threshold value, the processor 2400 may control the camera module 2200 to obtain a second image by activating the flash and photographing the subject.

According to an embodiment of the disclosure, the processor 2400 may perform pre-processing processes for inputting images to the image processing module 2340 to generate an image from which light reflection has been removed, by executing the image pre-processing module 2330.

According to an embodiment of the disclosure, the first image, the second image, and the depth image may be images of the subject photographed at different time points by different cameras included in the camera module 2200. The processor 2400 may project the first image, the second image, and the depth image onto a common image plane to match pixels representing the same location in an actual real space among pixels included in the first image, the second image, and the depth image. For example, the processor 2400 may project the first image, the second image, and the depth image onto the common image plane by rotating and twisting the first image, the second image, and the depth image on a three-dimensional space.

The processor 2400 may match a plurality of first pixels of the first image, a plurality of second pixels of the second image, and a plurality of third pixels of the depth image. When the processor 2400 matches corresponding points that are pixels representing the same location of an actual real space, the processor 2400 may use an epipolar constraint. The processor 2400 may perform image rectification for calculating an epipolar line representing candidate groups of the corresponding points using the epipolar constraint and matching the epipolar line. The processor 2400 may compare images transformed by a process of the image rectification with each other, search the corresponding points that are the pixels representing the same location of the actual real space, and match the searched corresponding points.

The processor 2400 may perform calibration on each of the first pixels of the first image, the second pixels of the second image, and the third pixels of the depth image such that the pixels in the individual images have the same brightness.

According to an embodiment of the disclosure, the processor 2400 may obtain an image from which light reflection has been removed, by executing the image processing module 2340. The processor 2400 may obtain the image from which light reflection has been removed, using one or more AI models included in the image processing module 2340.

For example, the processor 2400 may apply the first image to the main model, apply the depth image to the first sub model, and apply the second image to the second sub model. In such an example, output data from the first sub model and the second sub model may be input to at least one portion of neural network layers included in the main model. The main model may output an image from which light reflection has been removed. A method, performed by the processor 2400, of obtaining an image from which light reflection has been removed has been described in detail in the above-described embodiments of the disclosure, and therefore, overlapping descriptions thereof are omitted.

According to an embodiment of the disclosure, the processor 2400 may update the main model, the first sub model, and the second sub model included in the image processing module 2340. For example, the image-without-light-reflection identifying model of the image analysis module 2350 may be used. The image-without-light-reflection identifying model has been described above with reference to FIG. 14, and therefore, overlapping descriptions thereof are omitted.

Figure 16:
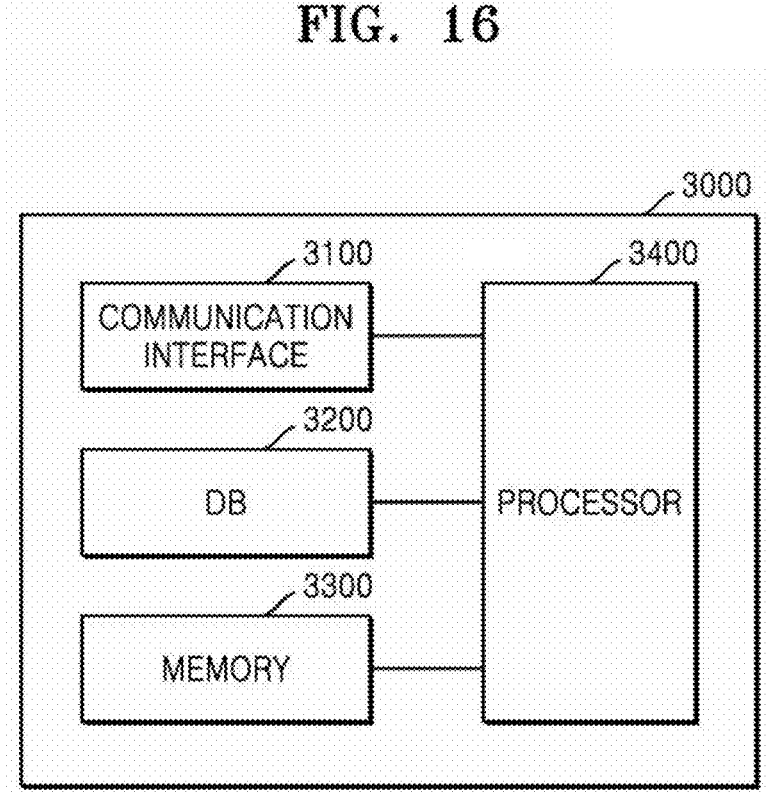
FIG. 16 is a block diagram illustrating a configuration of a server according to an embodiment of the disclosure.

FIG. 16 is a block diagram illustrating a configuration of a server, according to an embodiment of the disclosure.

A server 3000, according to an embodiment of the disclosure, may be connected to the electronic device 2000 by a wired or wireless communication method, and perform data communication with the electronic device 2000.

The server 3000, according to an embodiment of the disclosure, may include, at least, a communication interface 3100, database (DB) 3200, a memory 3300, and a processor 3400.

The communication interface 3100, according to an embodiment of the disclosure, may include one or more components for enabling communication through a LAN, a wide area network (WAN), a value added network (VAN), a mobile radio communication network, a satellite communication network, and a combination thereof.

The communication interface 3100, according to an embodiment of the disclosure, may transmit a light reflection detecting model, a main model, a first sub model, a second sub model, and image-without-light-reflection identifying models to the electronic device 2000. Alternatively or additionally, the communication interface 3100 may receive the light reflection detecting model, the main model, the first sub model, the second sub model, and the image-without-light-reflection identifying models from the electronic device 2000. The communication interface 3100 may update the light reflection detecting model, the main model, the first sub model, the second sub model, and the image-without-light-reflection identifying models, and then transmit the updated light reflection detecting model, the updated main model, the updated first sub model, the updated second sub model, and the updated image-without-light-reflection identifying models to the electronic device 2000.

The DB 3200 may store data received from the electronic device 2000 and data received from another external device (not shown). The DB 3200 may store a dataset for training which may be used to train the light reflection detecting model, the main model, the first sub model, the second sub model, the image-without-light-reflection identifying models, and individual AI models, generated through training.

The memory 3300 may store various data, programs, or applications for driving and controlling the server 3000. The programs stored in the memory 3300 may include one or more instructions. The programs (e.g., one or more instructions) or applications stored in the memory 3300 may be executed by the processor 3400. The memory 3300 may store a module for performing the same function as a module stored in the electronic device 2000. For example, the memory 3300 may store data and program instruction codes corresponding to a light reflection detecting module, a depth sensing module, an image pre-processing module, an image processing module, and an image analysis module.

The processor 3400 may control overall operations of the server 3000. The processor 3400, according to an embodiment of the disclosure, may execute one or more programs stored in the memory 3300.

The processor 3400, according to an embodiment of the disclosure, may include an AP, a CPU, a GPU, a neural processing unit, or an AI-dedicated processor designed as a hardware structure specialized for processing an AI model.

The processor 3400 may perform operations that may be performed by the electronic device 2000, according to the above-described embodiments of the disclosure.

The processor 3400 may obtain an image from which light reflection has been removed. The processor 3400 may receive a first image, a second image, and a depth image from the electronic device 2000, and obtain an image from which light reflection has been removed using the light reflection detecting model, the main model, the first sub model, and the second sub model stored in the DB 3200. A method, performed by the server 300, of obtaining an image from which light reflection has been removed, may correspond to a method, performed by the electronic device 2000, of obtaining an image from which light reflection has been removed, and therefore, overlapping descriptions thereof are omitted. For example, image pre-processing processes for obtaining an image from which light reflection has been removed may be performed by the electronic device 2000 or the server 3000.

According to an embodiment of the disclosure, the AI models stored in the server 3000 may be high-performance models capable of performing more operations than the AI models stored in the electronic device 2000.

Meanwhile, the block diagram of the electronic device 2000 illustrated in FIG. 15 and the block diagram of the server 3000 illustrated in FIG. 16 are block diagrams according to an embodiment of the disclosure. Individual components of the block diagrams may be integrated, other components may be added, or some of the components may be omitted, according to a specification of each device that is actually implemented. That is, two or more components may be integrated into a single component, or a single component may be divided into two or more components, as necessary. Also, functions performed by individual blocks are provided to describe embodiments of the disclosure, and detailed operations or devices may not limit the scope of the disclosure.

The operating method of the electronic device 2000, according to an embodiment of the disclosure, may be implemented in a program command form that can be executed by various computer means, and may be recorded on computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as compact disc read only memory (CD-ROM) and digital video disc (DVD), magneto-optical media such as floptical disks, and hardware devices, such as ROM, RAM, flash memory, and the like, specifically configured to store and execute program commands. Examples of the program commands include high-level language codes that can be executed on a computer through an interpreter or the like, as well as machine language codes produced by a compiler.

Alternatively or additionally, the operating method of the electronic device, according to the embodiments of the disclosure, may be included in a computer program product and provided. The computer program product may be traded between a seller and a purchaser.

The computer program product may include a software (S/W) program and a computer-readable storage medium storing an S/W program. For example, the computer program product may include an S/W program product (for example, a downloadable application) electronically distributed through a manufacturing company of the electronic device 2000 or an electronic market (for example, Google Play Store or App Store). For electronic distribution, at least one part of the software program may be stored in a storage medium or temporarily created. In this case, the storage medium may be a server of the manufacturing company, a server of the electronic market, or a storage medium of a relay server that temporarily stores an S/W program.

In a system configured with a server and a client, the computer program product may include a storage medium of the server or a storage medium of the client. Alternatively or additionally, when there is a third device (for example, a smart phone) communicating with the server or the client, the computer program product may include a storage medium of the third device. Alternatively or additionally, the computer program product may include an S/W program that is transmitted from the server to the client or the third device or from the third device to the client.

For example, one of the server, the client and the third device may execute the computer program product to perform the method according to the embodiments of the disclosure. In such an example, two or more of the server, the client and the third device may execute the computer program product to dispersively perform the method, according to the embodiments of the disclosure.

For example, the server (for example, a cloud server or an AI server) may execute the computer program product stored in the server to control the client communicating with the server to perform the method according to the embodiments of the disclosure.

Although the embodiments of the disclosure have been described in detail, the scope of rights of the disclosure is not limited to these embodiments. It will be understood that various modifications and variations may be made by those skilled in the art based on the fundamental concept of the disclosure as defined by the appended claims.

What is claimed is:

1. A method, performed by an electronic device, of processing an image, the method comprising:
    obtaining a first image by photographing a subject;
    obtaining a depth image including information related to a distance from the electronic device to the subject;
    determining whether light reflection exists in the first image;
    obtaining, based on determining that the light reflection exists in the first image, depth information indicating the distance from the electronic device to the subject;
    obtaining, based on the depth information, a second image by photographing the subject in an activated state of a flash of the electronic device;
    performing pre-processing for matching the first image, the second image, and the depth image and representing the first image, the second image, and the depth image on a coordinate system; and
    obtaining an image from which the light reflection has been removed using at least one of the pre-processed first image, the pre-processed second image, or the pre-processed depth image.

2. The method of claim 1, wherein the determining of whether the light reflection exists in the first image comprises applying the first image to a light reflection detecting model.

3. The method of claim 1, wherein the obtaining of the second image comprises determining whether to activate the flash of the electronic device by comparing the depth information with a threshold value.

4. The method of claim 3, wherein the determining of whether to activate the flash comprises, based on a result of the comparing of the depth information with the threshold value indicating that the depth information is smaller than the threshold value, determining to activate the flash of the electronic device and obtaining the second image by photographing the subject in the activated state of the flash of the electronic device.

5. The method of claim 4, wherein the obtaining of the image from which the light reflection has been removed comprises applying the first image, the second image, and the depth image to a light reflection removing model.

6. The method of claim 3, wherein the determining of whether to activate the flash comprises, based on a result of the comparing of the depth information with the threshold value indicating that the depth information is greater than or equal to the threshold value, inactivating the flash of the electronic device, and
    the obtaining of the image from which the light reflection has been removed comprises obtaining the image from which the light reflection has been removed using the pre-processed first image and the pre-processed depth image.

7. The method of claim 1, wherein the performing of the pre-processing comprises:
    projecting the first image, the second image, and the depth image onto a common image plane;
    matching first pixels of the first image, second pixels of the second image, and third pixels of the depth image; and
    performing calibration on each of the first pixels of the first image, the second pixels of the second image, and the third pixels of the depth image such that the first pixels of the first image, the second pixels of the second image, and the third pixels of the depth image have a same brightness.

8. The method of claim 5, wherein the applying of the first image, the second image, and the depth image to the light reflection removing model comprises:
    receiving, by a main model of the light reflection removing model, the first image and outputting the image from which the light reflection has been removed;
    receiving, by a first sub model of the light reflection removing model, the second image and outputting at least one first feature map related to the second image, wherein the at least one first feature map is to be input to a neural network layer included in the main model; and
    receiving, by a second sub model of the light reflection removing model, the depth image and outputting at least one second feature map related to the depth image, wherein the at least one second feature map is to be input to the neural network layer included in the main model.

9. The method of claim 8, wherein the light reflection removing model shares a feature map extracted from the first image, the second image, and the depth image, in at least one portion of a plurality of neural network layers included in the main model, the first sub model, and the second sub model.

10. The method of claim 5, further comprising:
    training a model configured to identify the image without the light reflection, using images from which the light reflection has been removed and which are output from the light reflection removing model, and other images without the light reflection; and
    updating the light reflection removing model, based on a loss function of the trained model configured to identify the image without the light reflection.

11. An electronic device for processing an image, the electronic device comprising:
    a camera module;
    a memory storing one or more instructions; and
    at least one processor communicatively coupled to the camera module and the memory, and configured to execute the one or more instructions stored in the memory to:
    obtain, using the camera module, a first image by photographing a subject;

obtain, using the camera module, a depth image including information related to a distance from the electronic device to the subject;

determine whether light reflection exists in the first image;

obtain, based on a determination that the light reflection exists in the first image, depth information indicating the distance from the electronic device to the subject;

obtain, based on the depth information, a second image by photographing the subject in an activated state of a flash of the electronic device;

perform pre-processing for matching the first image, the second image, and the depth image and representing the first image, the second image, and the depth image on a coordinate system; and obtain an image from which the light reflection has been removed, using at least one of the pre-processed first image, the pre-processed second image, or the pre-processed depth image.

12. The electronic device of claim 11, wherein the at least one processor is further configured to execute the one or more instructions to:

determine whether to activate the flash of the electronic device by comparing the depth information with a threshold value.

13. The electronic device of claim 12, wherein the at least one processor is further configured to execute the one or more instructions to:

obtain, based on a result of the comparing of the depth information with the threshold value indicating that the depth information is smaller than the threshold value, the second image by photographing, using the camera module, the subject in the activated state of the flash.

14. The electronic device of claim 13, wherein the at least one processor is further configured to execute the one or more instructions to:

apply the first image, the second image, and the depth image to a light reflection removing model.

15. The electronic device of claim 12, wherein the at least one processor is further configured to execute the one or more instructions to:

inactivate the flash of the electronic device based on a result of the comparing of the depth information with the threshold value indicating that the depth information is greater than or equal to the threshold value; and obtain the image from which the light reflection has been removed, using the pre-processed first image and the pre-processed depth image.

16. The electronic device of claim 11, wherein the at least one processor is further configured to execute the one or more instructions to:

project the first image, the second image, and the depth image onto a common image plane;

match first pixels of the first image, second pixels of the second image, and third pixels of the depth image; and perform calibration on each of the first pixels of the first image, the second pixels of the second image, and the third pixels of the depth image such that the first pixels of the first image, the second pixels of the second image, and the third pixels of the depth image have a same brightness.

17. The electronic device of claim 14, wherein the electronic device further comprises the light reflection removing model, and the light reflection removing model comprises:

a main model configured to receive the first image and output the image from which the light reflection has been removed;

a first sub model configured to receive the second image, and output at least one first feature map related to the second image, wherein the at least one first feature map is to be input to a neural network layer included in the main model; and a second sub model configured to receive the depth image, and output at least one second feature map related to the depth image, wherein the at least one second feature map is to be input to the neural network layer included in the main model.

18. The electronic device of claim 17, wherein the light reflection removing model is configured to share a feature map extracted from the first image, the second image, and the depth image, in at least one portion of a plurality of neural network layers included in the main model, the first sub model, and the second sub model.

19. The electronic device of claim 14, wherein the at least one processor is further configured to execute the one or more instructions to:

train a model configured to identify the image without the light reflection, using images from which the light reflection has been removed and which are output from the light reflection removing model, and other images without the light reflection, and update the light reflection removing model, based on a loss function of the trained model configured to identify the image without the light reflection.

20. A non-transitory computer-readable recording medium having recorded thereon a program for executing the method of claim 1, on a computer.

* * * * *